US009536342B2

(12) United States Patent
Sarel et al.

(10) Patent No.: US 9,536,342 B2
(45) Date of Patent: Jan. 3, 2017

(54) AUTOMATIC PARTITIONING TECHNIQUES FOR MULTI-PHASE PIXEL SHADING

(71) Applicant: INTEL CORPORATION, Santa Clara, CA (US)

(72) Inventors: Uzi Sarel, Zichron-Yaakov (IL); Tomer Bar-On, Petah Tikva (IL); Jacob Subag, Kiryat Haim (IL)

(73) Assignee: INTEL CORPORATION, Santa Clara, CA (US)

( * ) Notice: Subject to any disclaimer, the term of this patent is extended or adjusted under 35 U.S.C. 154(b) by 138 days.

(21) Appl. No.: 14/461,047

(22) Filed: Aug. 15, 2014

(65) Prior Publication Data
US 2016/0048998 A1    Feb. 18, 2016

(51) Int. Cl.
| G06T 15/20 | (2011.01) |
| G06T 15/80 | (2011.01) |
| G06T 15/00 | (2011.01) |
| G06F 9/455 | (2006.01) |

(52) U.S. Cl.
CPC ............ *G06T 15/005* (2013.01); *G06F 9/455* (2013.01)

(58) Field of Classification Search
None
See application file for complete search history.

(56) References Cited

U.S. PATENT DOCUMENTS

| 6,359,619 B1 | 3/2002 | Waters et al. |
| 2006/0267981 A1* | 11/2006 | Naoi ............... G06T 15/005 345/426 |
| 2012/0236000 A1 | 9/2012 | Abbas |
| 2013/0106902 A1 | 5/2013 | Iourcha et al. |

OTHER PUBLICATIONS

International Search Report and Written Opinion received for PCT Patent Application No. PCT/US2015/037429, mailed Oct. 14, 2015, 10 pages.
Vaidyanathan et al., "Coarse Pixel shading. In: High Performance Graphics", Jun. 2014, 10 pages.
He et al., "Extending the Graphics Pipeline with Adaptive, Multi-rate shading", ACM Transactions on Graphics (TOG)—Proceedings of ACM SIGGRAPH 2014. Jul. 2014, vol. 33 Issue 4 Article No. 142, 13 pages.

* cited by examiner

*Primary Examiner* — Yingchun He

(57) ABSTRACT

Automatic partitioning techniques for multi-phase pixel shading are described. In an example embodiment, an apparatus may comprise logic, at least a portion of which is in hardware, the logic to determine one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs, select a partitioning policy for the set of pixel shader inputs from among the one or more candidate partitioning policies based on the determined suitability metrics, and construct a multi-phase pixel shader for the graphics frame by partitioning the set of pixel shader inputs into multiple classes according to the selected partitioning policy. Other embodiments are described and claimed.

25 Claims, 12 Drawing Sheets

FIG. 9

Storage Medium 900

Computer Executable Instructions for 200

Computer Executable Instructions for 300

Computer Executable Instructions for 400

Computer Executable Instructions for 500

Computer Executable Instructions for 600

Computer Executable Instructions for 700

Computer Executable Instructions for 800

AUTOMATIC PARTITIONING TECHNIQUES FOR MULTI-PHASE PIXEL SHADING

BACKGROUND

In a graphics rendering pipeline, such as may be used to generate a two-dimensional (2D) raster representation of a three-dimensional (3D) scene, one or more pixel shaders may be implemented in order to assign colors and/or apply effects to pixels within the 2D raster representation. Especially with respect to high-resolution content, pixel shading may constitute a particularly significant consumer of graphics processing resources and/or power. One approach to reducing such processing and/or power costs is the implementation of multi-phase pixel shading. Multi-phase pixel shading may generally involve implementing different respective pixel shading rates for different sets of pixel shader inputs. Each possible pixel shading rate may embody a different underlying combination of comparative performance and quality. For example, for any particular set of pixel shader inputs, the use of a less computationally intensive coarse pixel shading rate may yield an increase in performance at a cost of some amount of image quality relative to the use of a standard pixel shading rate.

With respect to any given pixel shader, the implementation of multi-phase pixel shading will generally be most efficient when performance benefits are obtained at the least possible cost in terms quality, and/or when quality improvements are obtained at the least possible cost in terms of performance. A desirable partitioning of a set of pixel shader inputs for multi-phase pixel shading will partition the pixel shader inputs accordingly. However, manually determining a desirable partitioning for a set of pixel shader inputs can be a challenging task for developers, and may involve extensive analysis of shader usage and/or numerous trial-and-error iterations.

BRIEF DESCRIPTION OF THE DRAWINGS

FIG. 9 illustrates an embodiment of a storage medium

DETAILED DESCRIPTION

Figure 1:
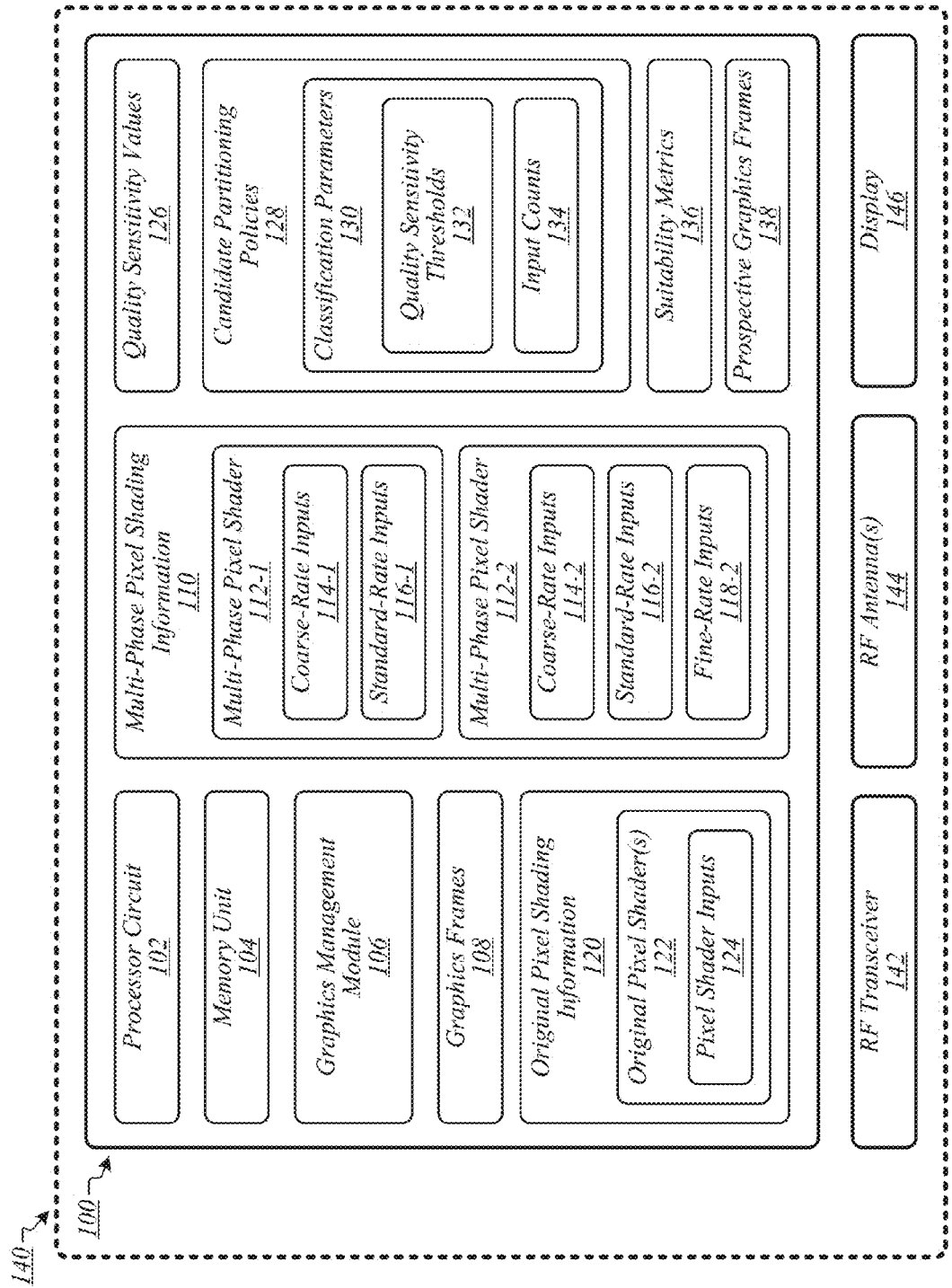
FIG. 1 illustrates an embodiment of an apparatus and an embodiment of a first system.

Disclosed herein are automatic partitioning techniques for multi-phase pixel shading. According to various such techniques, an iterative process may be implemented according to which one or more candidate partitioning policies are applied and their results evaluated. In some embodiments, each candidate partitioning policy may generally define a different manner in which a set of pixel shader inputs is to be partitioned based on the degree to which the overall quality of a graphics scene/frame is sensitive to changes in the respective pixel shading rates applied to those pixel shader inputs.

In one embodiment, for example, an apparatus may comprise logic, at least a portion of which is in hardware, the logic to determine one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs, select a partitioning policy for the set of pixel shader inputs from among the one or more candidate partitioning policies based on the determined suitability metrics, and construct a multi-phase pixel shader for the graphics frame by partitioning the set of pixel shader inputs into multiple classes according to the selected partitioning policy. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 1 illustrates a block diagram of an apparatus 100. As shown in FIG. 1, apparatus 100 comprises multiple elements including a processor circuit 102, a memory unit 104, and a graphics management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

In various embodiments, apparatus 100 may comprise a graphics management module 106. Graphics management module 106 may comprise logic, circuitry, and/or instructions operative to perform, manage, and/or control graphics processing calculations and/or operations on behalf of apparatus 100. In some embodiments, graphics management module 106 may be operative to manage and/or control a graphics processing unit (GPU) and/or other graphics processing circuitry that is operative to generate graphics frames for storage in one or more frame buffers used to present graphics on one or more displays. In various embodiments, graphics management module 106 may be operative to perform, manage, and/or control graphics processing calculations associated with pixel shading operations of a graphics rendering pipeline. The embodiments are not limited in this context.

FIG. 1 also illustrates a block diagram of a system 140. System 140 may comprise any of the aforementioned elements of apparatus 100. System 140 may further comprise a radio frequency (RF) transceiver 144. RF transceiver 144 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 144 may operate in accordance with one or more applicable standards in any version. The embodiments are not limited in this context.

In some embodiments, system 140 may comprise one or more RF antennas 146. Examples of any particular RF antenna 146 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 144 may be operative to send and/or receive messages and/or data using one or more RF antennas 146. The embodiments are not limited in this context.

In some embodiments, system 140 may comprise a display 145. Display 145 may comprise any display device capable of displaying information received from processor circuit 102. Examples for display 145 may include a television, a monitor, a projector, and a computer screen. In one embodiment, for example, display 145 may be implemented by a liquid crystal display (LCD), light emitting diode (LED) or other type of suitable visual interface. Display 145 may comprise, for example, a touch-sensitive display screen ("touchscreen"). In various implementations, display 145 may comprise one or more thin-film transistors (TFT) LCD including embedded transistors. The embodiments, however, are not limited to these examples.

In general operation of apparatus 100 and/or system 140, graphics management module 106 may be operative to generate various types of graphics information for use by a graphics rendering pipeline to produce graphics frames 108 for presentation on one or more displays, such as display 146. In some embodiments, the graphics information that graphics management module 106 generates may include pixel shading information that defines, for one or more graphics frames 108, one or more pixel shaders and a respective set of inputs for each of the one or more pixel shaders. In various embodiments, graphics management module 106 may be operative to generate multi-phase pixel shading information 110 to support implementation of multi-phase pixel shading procedures in the graphics rendering pipeline. In some embodiments, multi-phase pixel shading information 110 may define one or more multi-phase pixel shaders 112. In various embodiments, for each multi-phase pixel shader 112, multi-phase pixel shading information 110 may define multiple input sets, each of which may correspond to a different pixel shading rate. For example, in some embodiments, multi-phase pixel shading information 110 may define coarse-rate inputs 114-1 and standard-rate inputs 116-1 for a multi-phase pixel shader 112-1. In another example, in various embodiments, multi-phase pixel shading information 110 may define coarse-rate inputs 114-2, standard-rate inputs 116-2, and fine-rate inputs 118-2 for a multi-phase pixel shader 112-2. The embodiments are not limited to these examples.

In some embodiments, graphics management module 106 may be operative to employ automatic partitioning techniques in conjunction with generating multi-phase pixel shading information 110. In various such embodiments, graphics management module 106 may be operative to employ automatic partitioning techniques to generate multi-phase pixel shading information 110 based on original pixel shading information 120. In some embodiments, original pixel shading information 120 may comprise information that defines pixel shaders and corresponding inputs for rendering one or more graphics frames 108 using single-phase pixel shading procedures. In various embodiments, original pixel shading information 120 may comprise information associated with legacy pixel shaders, such as may have been created during development of an application to which the one or more graphics frames 108 correspond. In some embodiments, original pixel shading information 120 may define one or more original pixel shaders 122. In various embodiments, for each original pixel shader 122, original pixel shading information 120 may define a corresponding set of pixel shader inputs 124. The embodiments are not limited in this context.

In some embodiments, graphics management module 106 may be operative to implement automatic partitioning for multi-phase pixel shading of any given graphics frame 108 based on original pixel shading information 120 for that graphics frame 108. In various embodiments, according to such automatic partitioning techniques, graphics management module 106 may be operative to generate multiple input sets for a multi-phase pixel shader 112 of any given graphics frame 108 by partitioning the pixel shader inputs 124 for an original pixel shader 122 of that graphics frame 108. For example, in some embodiments, graphics management module 106 may be operative to use automatic partitioning techniques to partition the pixel shader inputs 124 for an original pixel shader 122 into the coarse-rate inputs 114-1 and standard-rate inputs 116-1 for multi-phase pixel shader 112-1. In another example, in various embodiments, graphics management module 106 may be operative to use automatic partitioning techniques to partition the pixel shader inputs 124 for an original pixel shader 122 into the coarse-rate inputs 114-2, standard-rate inputs 116-2, and fine-rate inputs 118-2 for multi-phase pixel shader 112-2. The embodiments are not limited to these examples.

In some embodiments, for any particular set of pixel shader inputs 124, graphics management module 106 may be operative to determine a corresponding set of quality sensitivity values 126. In various embodiments, each quality sensitivity value 126 may generally comprise an indicator/estimate of an approximate extent to which a perceived level of quality of a generated graphics frame 108 may be expected to be sensitive to the pixel shading rate applied to a respective pixel shader input 124. In some embodiments, graphics management module 106 may be operative to calculate each quality sensitivity value 126 based on the plane equation for its corresponding pixel shader input 124. In various embodiments, for each pixel shader input 124, graphics management module 106 may be operative to identify a plane equation of the form of Equation (1) as follows:

$$V_i(x,y)=Ax+By+C \quad (1)$$

where $V_i(x, y)$ represents the value of the pixel shader input 124 at raster coordinates (x, y), and A, B, and C are constants. In some embodiments, graphics management module 106 may be operative to calculate each quality sensitivity value 126 based on the input gradient for its corresponding pixel shader input 124. In various embodiments, graphics management module 106 may be operative to calculate each quality sensitivity value 126 as the $95^{th}$ percentile of the supremum norm of the input gradient (A, B) for its corresponding pixel shader input 124. In some other embodiments, graphics management module 106 may be operative to calculate quality sensitivity values 126 using other gradient norms, other statistical constructs such as averages or other p-percentiles, or other values obtained from shader input derivatives. The embodiments are not limited in this context.

In various embodiments, graphics management module 106 may generally be operative to utilize a set of quality sensitivity values 126 for a set of pixel shader inputs 124 to perform partitioning decisions for that set of pixel shader inputs 124. In some embodiments, graphics management module 106 may be operative to evaluate one or more candidate partitioning policies 128 for partitioning the set of pixel shader inputs 124 based on its corresponding set of quality sensitivity values 126. In various embodiments, each candidate partitioning policy 128 may generally comprise one or more classification parameters 130 according to which each pixel shader input 124 in the set is assigned to one of multiple possible classes according to its corresponding quality sensitivity value 126. In some embodiments, each of the multiple possible classes may correspond to a respective one of multiple pixel shading rates to be utilized in a multi-phase pixel shading procedure. For example, with respect to a multi-phase pixel shading procedure that involves the use of both coarse pixel shading and standard pixel shading, a given candidate partitioning policy 128 may comprise one or more classification parameters 130 according to which each pixel shader input 124 in the set is to be assigned to either a coarse-rate class comprising coarse-rate inputs 114-1 or a standard-rate class comprising standard-rate inputs 116-1 based on its corresponding quality sensitivity value 126. In another example, with respect to a multi-phase pixel shading procedure that involves the use of coarse pixel shading, standard pixel shading, and sub-pixel/sample pixel shading, a given candidate partitioning policy 128 may comprise one or more classification parameters 130 according to which each pixel shader input 124 in the set is to be assigned to either a coarse-rate class comprising coarse-rate inputs 114-2, a standard-rate class comprising standard-rate inputs 116-2, or a fine-rate class comprising fine-rate inputs 118-2 based on its corresponding quality sensitivity value 126. The embodiments are not limited to these examples.

In various embodiments, the classification parameters 130 of any given candidate partitioning policy 128 may comprise one or more quality sensitivity thresholds 132 that specify how pixel shader inputs 124 in a set are to be classified based on their respective quality sensitivity values 126. In some embodiments, each quality sensitivity threshold 132 may comprise a value to which a quality sensitivity value 126 is to be compared in order to determine whether a corresponding pixel shader input 124 should or should not be assigned to a particular class. For example, according to a given candidate partitioning policy 128 in various embodiments, all pixel shader inputs 124 featuring associated quality sensitivity values 126 below a quality sensitivity threshold 132 may be classified as coarse-rate inputs, while all other pixel shader inputs 124 may be classified as standard-rate inputs. In another example, according to a given candidate partitioning policy 128 in some embodiments, all pixel shader inputs 124 featuring associated quality sensitivity values 126 below a first quality sensitivity threshold 132 may be classified as coarse-rate inputs, all pixel shader inputs 124 featuring associated quality sensitivity values 126 above a second quality sensitivity threshold 132 may be classified as fine-rate inputs, and all other pixel shader inputs 124 may be classified as standard-rate inputs. In various embodiments, the candidate partitioning policies 128 among a set of candidate partitioning policies 128 that graphics management module 106 evaluates may differ from each other with respect to the particular quality sensitivity thresholds 132 that they define. The embodiments are not limited in this context.

In some embodiments, the classification parameters 130 of any given candidate partitioning policy 128 may comprise one or more input counts 134 that specify how pixel shader inputs 124 in a set are to be classified based on their respective quality sensitivity values 126. In various embodiments, each input count 134 may specify a number of pixel shader inputs 124 that are to be assigned to a particular class. For example, according to a given candidate partitioning policy 128 in some embodiments, an input count 134 may specify that twenty-five pixel shader inputs 124, comprising those featuring the twenty-five lowest quality sensitivity values 126, are to be classified as coarse-rate inputs. In another example, according to a given candidate partitioning policy 128 in various embodiments, a first input count 134 may specify that twenty-five pixel shader inputs 124, comprising those featuring the twenty-five lowest quality sensitivity values 126, are to be classified as coarse-rate inputs, and that twenty pixel shader inputs 124, comprising those featuring the twenty highest quality sensitivity values 126, are to be classified as fine-rate inputs. In some embodiments, the candidate partitioning policies 128 among a set of candidate partitioning policies 128 that graphics management module 106 evaluates may differ from each other with respect to the particular input counts 134 that they define. The embodiments are not limited in this context.

In various embodiments, graphics management module 106 may be operative to evaluate any particular candidate partitioning policy 128 based on one or more factors in order to determine how suitable that candidate partitioning policy 128 is for application to its associated set of pixel shader inputs 124. In some embodiments, some or all of such factors may relate to the performance/quality tradeoff associated with application of the candidate partitioning policy 128. For example, in various embodiments, graphics management module 106 may be operative to evaluate any particular candidate partitioning policy 128 based on a quality cost associated with application of that candidate partitioning policy 128. In some such embodiments, the quality cost may generally comprise an extent to which implementing multi-phase pixel shading according to the candidate partitioning policy 128 will sacrifice perceived image quality relative to the use of an existing single-phase pixel shader. In various embodiments, graphics management module 106 may additionally or alternatively be operative to evaluate any particular candidate partitioning policy 128 based on a performance benefit associated with application of that candidate partitioning policy 128. In some such embodiments, the performance benefit may generally comprise an extent to which implementing multi-phase pixel shading according to the candidate partitioning policy 128 will yield a performance improvement relative to the use of an existing single-phase pixel shader. In various embodiments, such a performance improvement may constitute a reduction in graphics memory bandwidth consumption, an increase in graphics processing speed and/or frame rate, a reduction in power consumption, or a combination of multiple such benefits and/or one or more other positive effects. In some embodiments, in order to determine a suitability of any particular candidate partitioning policy 128, graphics management module 106 may be operative to consider one or more other factors in addition to, or instead of, factors relating to the associated with application of the candidate partitioning policy 128. The embodiments are not limited in this context.

In various embodiments, graphics management module 106 may be operative to determine one or more suitability metrics 136 for a given candidate partitioning policy 128 and to evaluate that candidate partitioning policy 128 based on those one or more suitability metrics 136. In some embodiments, each suitability metric 136 may comprise an indicator corresponding to one or more factors that are relevant to the suitability of the candidate partitioning policy 128. More particularly, in various embodiments, each suitability metric 136 may comprise a quantitative indicator for use in consideration of one or more such factors. For example, in some embodiments, graphics management module 106 may be operative to determine a suitability metric 136 that comprises a quantitative indication of an expected perceived quality of an image. In another example, in various embodiments, graphics management module 106 may be operative to determine a suitability metric 136 that comprises a quantitative indication of an expected graphics memory bandwidth consumption. The embodiments are not limited to these examples.

In some embodiments, suitability metrics 136 may include one or more absolute indicators that describe factors related to the suitability of a given candidate partitioning policy 128 without reference to other possible approaches. For example, a given suitability metric 136 may comprise an indication of the amount of graphics memory bandwidth that will be consumed by a multi-phase pixel shading procedure that implements a particular candidate partitioning policy 128. In various embodiments, suitability metrics 136 may additionally or alternatively include one or more relative indicators that describe factors related to the suitability of a given candidate partitioning policy 128 in comparative terms. In some embodiments, suitability metrics 136 may include one or more relative indicators that compare the expected results of multi-phase pixel shading using a given candidate partitioning policy 128 to those of single-phase pixel shading via an original pixel shader 122. In various embodiments, for example, a given suitability metric 136 may comprise an indication of an expected change in perceived image quality resulting from performing multi-phase pixel shading using a given candidate partitioning policy 128 rather than performing single-phase pixel shading. In another example, in some embodiments, a given suitability metric 136 may comprise an indication of a reduction in graphics memory bandwidth consumption, an increase in graphics processing speed and/or frame rate, or a reduction in power consumption. The embodiments are not limited to these examples.

In various embodiments, in order to enable determination of one or more comparative suitability metrics 136 for any particular candidate partitioning policy 128, graphics management module 106 may be operative to generate a prospective graphics frame 138 that corresponds to that candidate partitioning policy 128. More particularly, in some embodiments, graphics management module 106 may be operative to partition a set of pixel shader inputs 124 according to the candidate partitioning policy 128 and perform multi-phase pixel shading using the partitioned inputs to obtain a prospective graphics frame 138 that corresponds to the candidate partitioning policy 128. In various embodiments, graphics management module 106 may be operative to determine one or more comparative suitability metrics 136 by comparing the prospective graphics frame 138 with an original graphics frame 108 obtained via application of an original pixel shader 122 to the set of pixel shader inputs 124. In some embodiments, graphics management module 106 may be operative to determine a comparative suitability metric 136 that generally indicates a degree to which the prospective graphics frame 138 is similar to—or differs from—the original graphics frame 108. In various embodiments, for example, graphics management module 106 may be operative to determine a structural similarity metric (SSIM) that describes the similarity of the prospective graphics frame 138 to the original graphics frame 108. Other examples of such a comparative suitability metric 136 may include a structural dissimilarity metric (DSSIM), a peak signal-to-noise ratio (PSNR), a mean squared error (MSE), a universal quality index (UQI), and a video quality metric (VQM). The embodiments are not limited to these examples.

In some embodiments, graphics management module 106 may be operative to employ a multi-phase pixel shading decision algorithm to determine whether and/or how to partition the set of pixel shader inputs 124 for an original pixel shader 122 into multiple set of inputs for a multi-phase pixel shader 112. In various embodiments, in conjunction with application of the multi-phase pixel shading decision algorithm, graphics management module 106 may be operative to evaluate one or more candidate partitioning policies 128 according to their corresponding suitability metrics 136.

In some embodiments, the multi-phase pixel shading decision algorithm may comprise one or more rules that define standards of acceptability for the results achieved via application of multi-phase pixel shading. In various embodiments, such standards of acceptability may be defined based on a single suitability factor or on multiple such factors. In some embodiments, any particular candidate partitioning policy 128 may be evaluated based on one or more suitability metrics 136 that indicate the effects of that policy with respect to one or more factors based upon which such standards of acceptability are defined. For example, in various embodiments, the multi-phase pixel shading decision algorithm may specify that any given candidate partitioning policy 128 is considered to yield acceptable results only if its corresponding SSIM is above a threshold. In another example, in some embodiments, the multi-phase pixel shading decision algorithm may specify that any given candidate partitioning policy 128 is considered to yield acceptable results only if a suitability metric 136 indicates that an expected performance benefit is above a particular threshold. In a third example, in various embodiments, the two aforementioned standards may be combined, such that any given candidate partitioning policy 128 must offer a performance benefit above one threshold while maintaining an SSIM above another threshold in order to be considered acceptable for use. It is to be appreciated that the embodiments are not limited to these examples, and that other standards/thresholds and/or combinations thereof may additionally or alternatively be utilized in some embodiments. The embodiments are not limited in this context.

In various embodiments, the multi-phase pixel shading decision algorithm may additionally or alternatively comprise one or more rules for use in selecting between multiple candidate partitioning policies 128, based on their respective suitability metrics 136. In some embodiments, one or more such rules may specify comparisons between multiple candidate partitioning policies 128 based on a single factor. In various embodiments, for example, the multi-phase pixel shading decision algorithm may specify that from among a plurality of candidate partitioning policies 128, the candidate partitioning policy 128 that yields a highest SSIM is to be selected for implementation. In some embodiments, one or more such rules may specify comparisons between multiple candidate partitioning policies 128 based on multiple factors. In various embodiments, for example, the multi-phase pixel shading decision algorithm may specify that from among a plurality of candidate partitioning policies 128, the candidate partitioning policy 128 that provides a largest performance benefit among those policies yielding SSIMs above a cutoff threshold is to be selected for implementation. In some embodiments, the multi-phase pixel shading decision algorithm may comprise one or more rules for obtaining composite indicators of suitability based on multiple factors affected by the use of multi-phase pixel shading. In various embodiments, for example, the multi-phase pixel shading decision algorithm may define a composite suitability metric as a weighted combination of suitability metrics 136 describing the respective performance and quality impacts of each of various candidate partitioning policies 128, and may stipulate that the candidate partitioning policy 128 corresponding to the highest composite suitability metric is to be selected for implementation. The embodiments are not limited to these examples.

In some embodiments, after selecting a partitioning policy from among one or more candidate partitioning policies 128 for a set of pixel shader inputs 124 of a graphics frame 108, graphics management module 106 may be operative to construct a multi-phase pixel shader 112 for the graphics frame 108. In various embodiments, graphics management module 106 may be operative to construct the multi-phase pixel shader 112 by partitioning the set of pixel shader inputs 124 into multiple classes according to the selected partitioning policy. In an example embodiment, graphics management module 106 may be operative to construct multi-phase pixel shader 112-1 by partitioning a set of pixel shader inputs 124 into coarse-rate inputs 114-1 and standard-rate inputs 116-1 according to a selected partitioning policy. In another example embodiment, graphics management module 106 may be operative to construct multi-phase pixel shader 112-2 by partitioning a set of pixel shader inputs 124 into coarse-rate inputs 114-2, standard-rate inputs 116-2, and fine-rate inputs 118-2 according to a selected partitioning policy. The embodiments are not limited to these examples.

Figure 2:
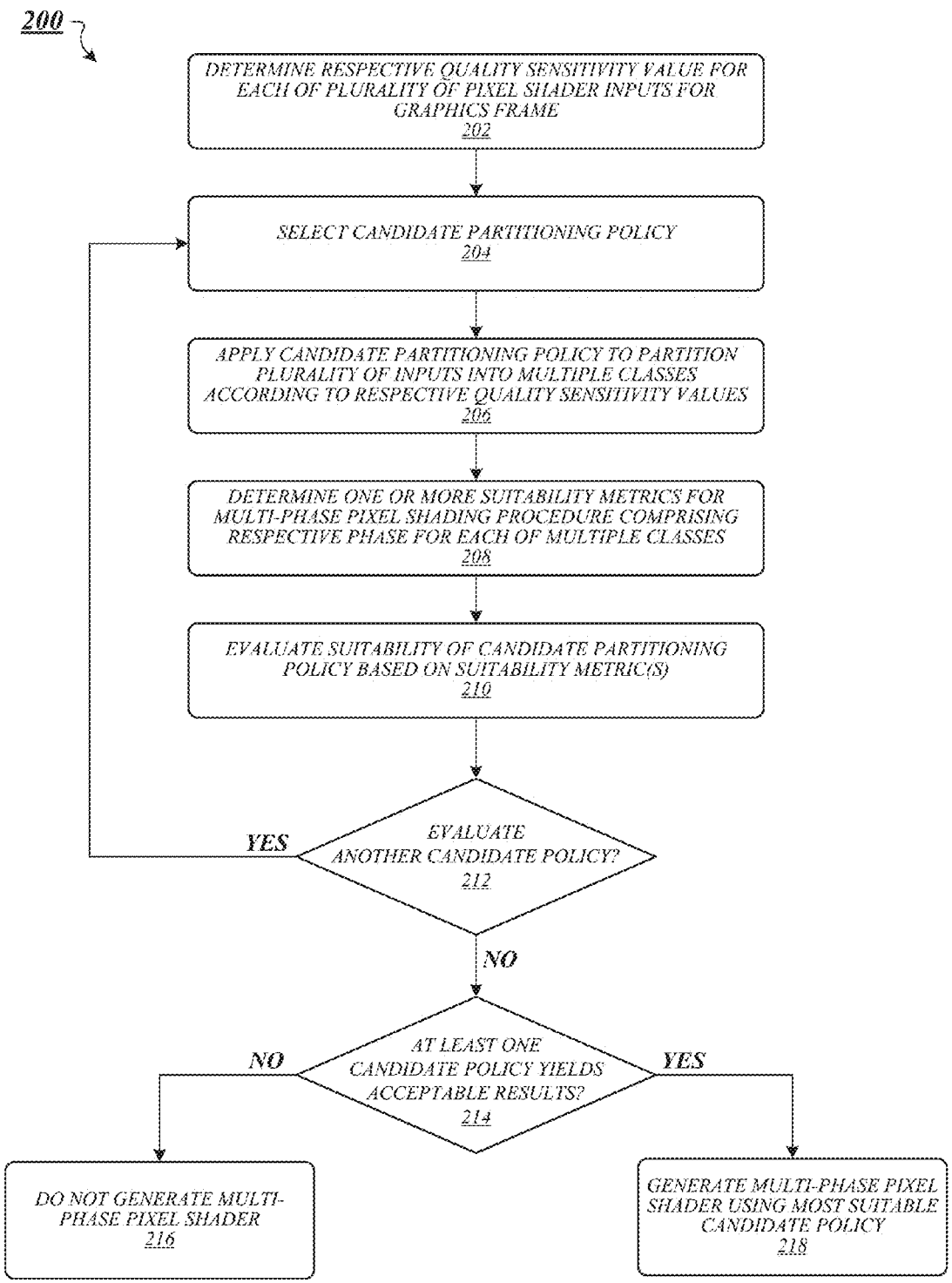
FIG. 2 illustrates an embodiment of a first logic flow.

FIG. 2 illustrates a logic flow 200 such as may be representative of some embodiments. For example, logic flow 200 may be representative of operations that graphics management module 106 of FIG. 1 may perform in various embodiments in conjunction with considering prospective application of multi-phase pixel shading techniques to a set of pixel shader inputs. As shown in logic flow 200, a respective quality sensitivity value may be determined at 202 for each of a plurality of pixel shader inputs for a graphics frame. In some embodiments, the plurality of pixel shader inputs may comprise a set of pixel shader inputs of an original pixel shader for the graphics frame. For example, graphics management module 106 of FIG. 1 may be operative to determine a corresponding set of quality sensitivity values 126 for a set of pixel shader inputs 124 of an original pixel shader 122 for a graphics frame 108. At 204, a candidate partitioning policy may be selected for analysis. For example, graphics management module 106 of FIG. 1 may be operative to select a candidate partitioning policy 128 for analysis. At 206, the candidate partitioning policy may be applied to partition the plurality of pixel shader inputs into multiple classes according to their respective quality sensitivity values. For example, graphics management module 106 of FIG. 1 may be operative to apply a candidate partitioning policy 128 to partition a set of pixel shader inputs 124 into coarse-rate inputs 114 and standard-rate inputs 116 according to their respective quality sensitivity values 126.

At 208, one or more suitability metrics may be determined for a multi-phase pixel shading procedure that comprises a respective phase for each of the multiple classes into which the plurality of inputs was partitioned at 206. For example, graphics management module 106 of FIG. 1 may be operative to determine one or more suitability metrics 136 for a candidate partitioning policy 128 that it applied to partition a set of pixel shader inputs 124 into coarse-rate inputs 114 and standard-rate inputs 116. At 210, the suitability of the candidate partitioning policy may be evaluated based on the one or more suitability metrics. For example, graphics management module 106 of FIG. 1 may be operative to evaluate the suitability of a candidate partitioning policy 128 based on one or more suitability metrics 136 that it determines for that candidate partitioning policy 128. In various embodiments, evaluation of the candidate partitioning policy at 210 may be performed according to a multi-phase pixel shading decision algorithm. In some such embodiments, evaluation of the candidate partitioning policy at 210 may include a determination, according to the multi-phase pixel shading decision algorithm, of whether the candidate partitioning policy yields acceptable results. At 212, it may be determined whether another candidate partitioning policy is to be evaluated. For example, graphics management module 106 of FIG. 1 may be operative to determine whether to evaluate another candidate partitioning policy 128. If it is determined at 212 that another candidate partitioning policy is to be evaluated, flow may return to 204, where another candidate partitioning policy may be selected for evaluation. If it is determined at 212 that no other candidate partitioning policy is to be evaluated, flow may pass to 214.

At 214, it may be determined whether at least one of the candidate partitioning policies that have been evaluated will yield acceptable results. For example, graphics management module 106 of FIG. 1 may be operative to determine whether at least one candidate partitioning policy 128 that it has evaluated will yield acceptable results. In various embodiments, this determination may be made by reference to individual determinations of acceptability performed during the evaluations of various candidate partitioning policies at 210. If it is determined at 214 that no candidate partitioning policy yields acceptable results, flow may pass to 216, where it may be determined that no multi-phase pixel shader should be generated for the set of pixel shader inputs under consideration. For example, graphics management module 106 of FIG. 1 may be operative to determine not to convert an original pixel shader 122 into a multi-phase pixel shader 112 if it has determined that no candidate partitioning policy 128 for the set of pixel shader inputs 124 to the original pixel shader 122 yields acceptable results. If it is determined at 214 that at last one candidate partitioning policy yields acceptable results, flow may pass to 218. At 218, a multi-phase pixel shader may be generated using the most suitable candidate partitioning policy among those that have been evaluated. For example, graphics management module 106 may be operative to convert an original pixel shader 122 into a multi-phase pixel shader 112 according to a most suitable candidate partitioning policy 128 for the set of pixel shader inputs 124 for the original pixel shader 122. In some embodiments, the most suitable candidate partitioning policy may be identified at 218 according to a multi-phase pixel shading decision algorithm, based on the respective suitability metric(s) for the various candidate partitioning policies that have been evaluated. The embodiments are not limited in this context.

It is worthy of note that although logic flow 200 includes an acceptability determination at 214 and a potential determination at 216 to not implement any of the considered partitioning policies, the embodiments are not so limited. Whether these operations are performed or omitted may vary from embodiment to embodiment, based on numerous possible design/implementation-specific considerations. In various embodiments, once all candidate partitioning policies have been evaluated, flow may pass from 212 directly to 218, where the most suitable of the policies may be used to generate a multi-phase pixel shader. The embodiments are not limited in this context.

Figure 3:
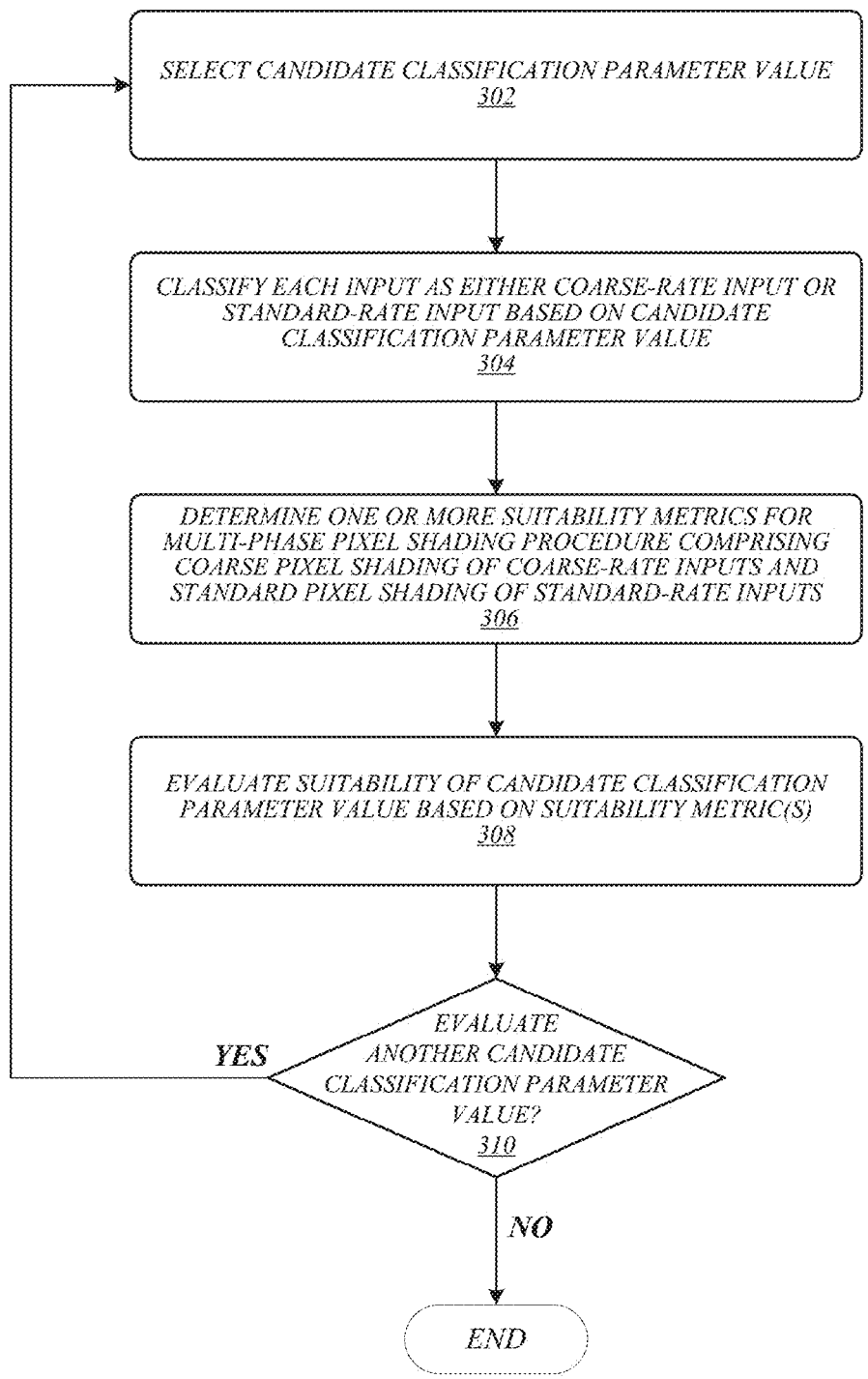
FIG. 3 illustrates an embodiment of a second logic flow

FIG. 3 illustrates a logic flow 300 such as may be representative of the operations at blocks 204 to 212 in logic flow 200 of FIG. 2 in some embodiments. More particularly, logic flow 300 may be representative of such operations in various embodiments in which each candidate partitioning policy comprises a respective candidate value for a classification parameter according to which a set of pixel shader inputs may be partitioned into course-rate inputs and standard-rate inputs. For example, logic flow 300 may be representative of operations that graphics management module 106 of FIG. 1 may perform in some embodiments to evaluate candidate values for a classification parameter 130 for prospective use to partition a set of pixel shader inputs 124 into coarse-rate inputs 114-1 and standard-rate inputs 116-1. As shown in logic flow 300, a candidate classification parameter value may be selected at 302. For example, graphics management module 106 of FIG. 1 may be operative to select a candidate partitioning policy 128 that specifies a particular value for a classification parameter 130. At 304, each of a set of pixel shader inputs may be classified as either a coarse-rate input or a standard-rate input based on the candidate classification parameter value. For example, graphics management module 106 of FIG. 1 may be operative to classify each of a set of pixel shader inputs 124 as either a coarse-rate input 114-1 or a standard-rate input 116-1 based on the value specified for the classification parameter 130 by the selected candidate partitioning policy 128.

At 306, one or more suitability metrics may be determined for a multi-phase pixel shading procedure that comprises coarse pixel shading of the coarse-rate inputs and standard pixel shading of the standard-rate inputs according to the classifications performed at 304. For example, graphics management module 106 of FIG. 1 may be operative to determine one or more suitability metrics 136 for a multi-phase pixel shading procedure that comprises coarse pixel shading of coarse-rate inputs 114-1 and standard pixel shading of standard-rate inputs 116-1. At 308, the suitability of the candidate classification parameter value may be evaluated based on the one or more suitability metrics. For example, graphics management module 106 of FIG. 1 may be operative to evaluate the suitability of the candidate partitioning policy 128 that specifies the particular value for the classification parameter 130, based on one or more suitability metrics 136 determined at 306. At 310, it may be determined whether another candidate classification parameter value is to be evaluated. For example, graphics management module 106 of FIG. 1 may be operative to determine whether to evaluate another candidate partitioning policy 128 that specifies a different respective value for the classification parameter 130. If it is determined at 310 that another candidate classification parameter value is to be evaluated, flow may return to 302, where another candidate classification parameter value may be selected for evaluation. If it is determined at 310 that no other candidate classification parameter value is to be evaluated, the logic flow may end. The embodiments are not limited in this context.

Figure 4:
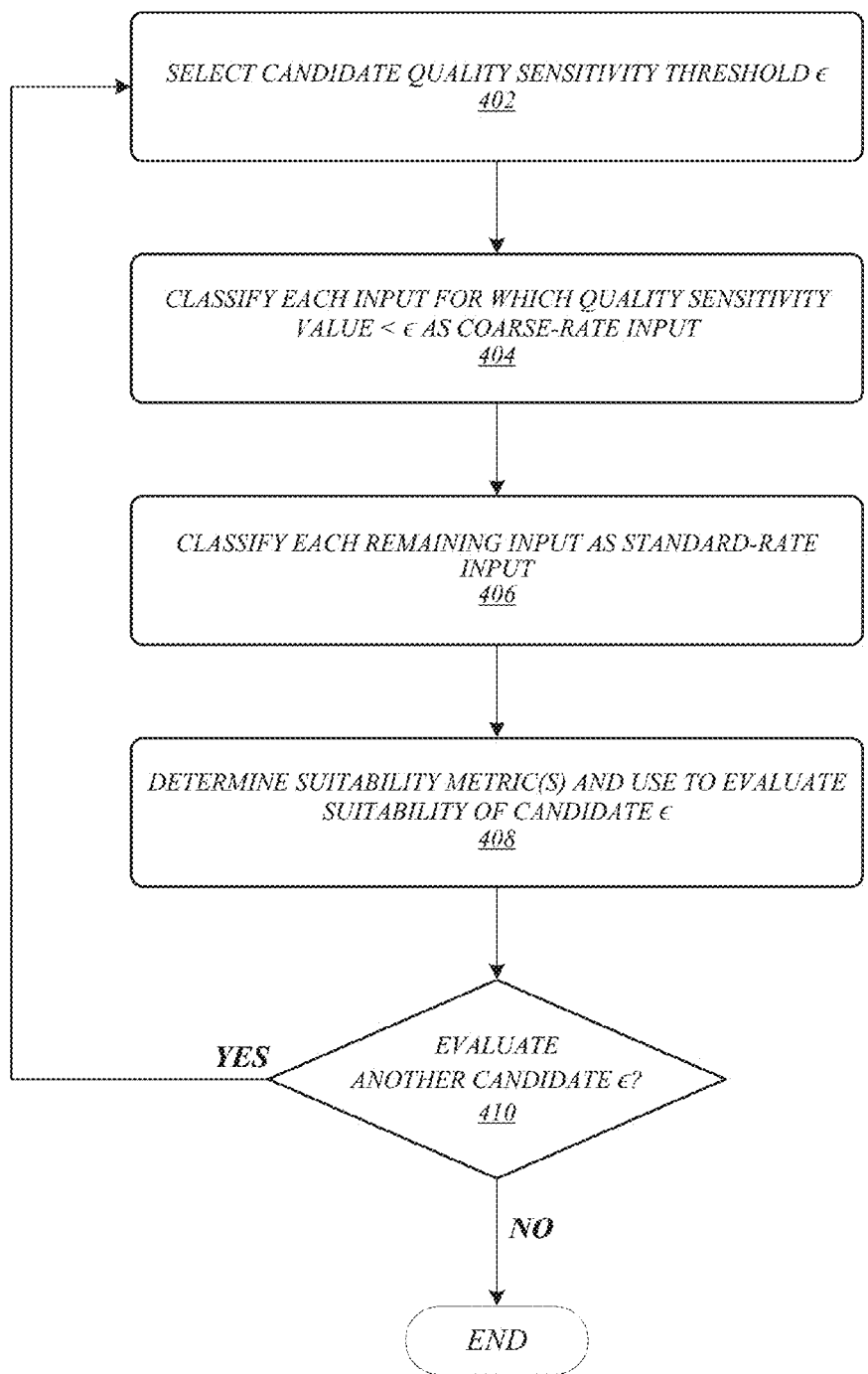
FIG. 4 illustrates an embodiment of a third logic flow

FIG. 4 illustrates a logic flow 400 such as may be representative of the operations at blocks 302 to 310 in logic flow 300 of FIG. 3 in various embodiments in which the classification parameter for which one or more candidate values are evaluated comprises a quality sensitivity threshold such as a quality sensitivity threshold 132 of FIG. 1.

More particularly, logic flow 400 may be representative of such operations in some embodiments in which the classification parameter comprises a coarse-rate quality sensitivity threshold. As shown in logic flow 400, a candidate quality sensitivity threshold $\epsilon$ may be selected at 402. For example, graphics management module 106 of FIG. 1 may be operative to select a candidate partitioning policy 128 that specifies a particular value for a quality sensitivity threshold 132 for coarse-rate inputs 114-1. At 404, each pixel shader input for which the corresponding quality sensitivity value is less than the candidate $\epsilon$ may be classified as a coarse-rate input. For example, with respect to a set of pixel shader inputs 124 for an original pixel shader 122, graphics management module 106 of FIG. 1 may be operative to classify each pixel shader input 124 for which the corresponding quality sensitivity value 126 is less than the candidate $\epsilon$ as a course-rate input 114-1.

At 406, each remaining pixel shader input may be classified as a standard-rate input. For example, following its aforementioned determination of course-rate inputs 114-1 at 404, graphics management module 106 of FIG. 1 may be operative to classify the remaining pixel shader inputs 124 among the set as standard-rate inputs 116-1. At 408, one or more suitability metrics may be determined for the candidate $\epsilon$ and may be used to evaluate the suitability of the candidate $\epsilon$. For example, graphics management module 106 of FIG. 1 may be operative to determine one or more suitability metrics 136 for a multi-phase pixel shading procedure that comprises coarse pixel shading of the coarse-rate inputs 114-1 and standard pixel shading of the standard-rate inputs 116-1, and may be operative to evaluate the suitability of the candidate partitioning policy 128 that specifies the particular value for the quality sensitivity threshold 132 based on the one or more suitability metrics 136. At 410, it may be determined whether another candidate $\epsilon$ is to be evaluated. For example, graphics management module 106 of FIG. 1 may be operative to determine whether to evaluate another candidate partitioning policy 128 that specifies a different respective value for the quality sensitivity threshold 132 for coarse-rate inputs 114-1. If it is determined at 410 that another candidate $\epsilon$ is to be evaluated, flow may return to 402, where another candidate $\epsilon$ may be selected for evaluation. If it is determined at 410 that no other candidate $\epsilon$ is to be evaluated, the logic flow may end. The embodiments are not limited in this context.

Figure 5:
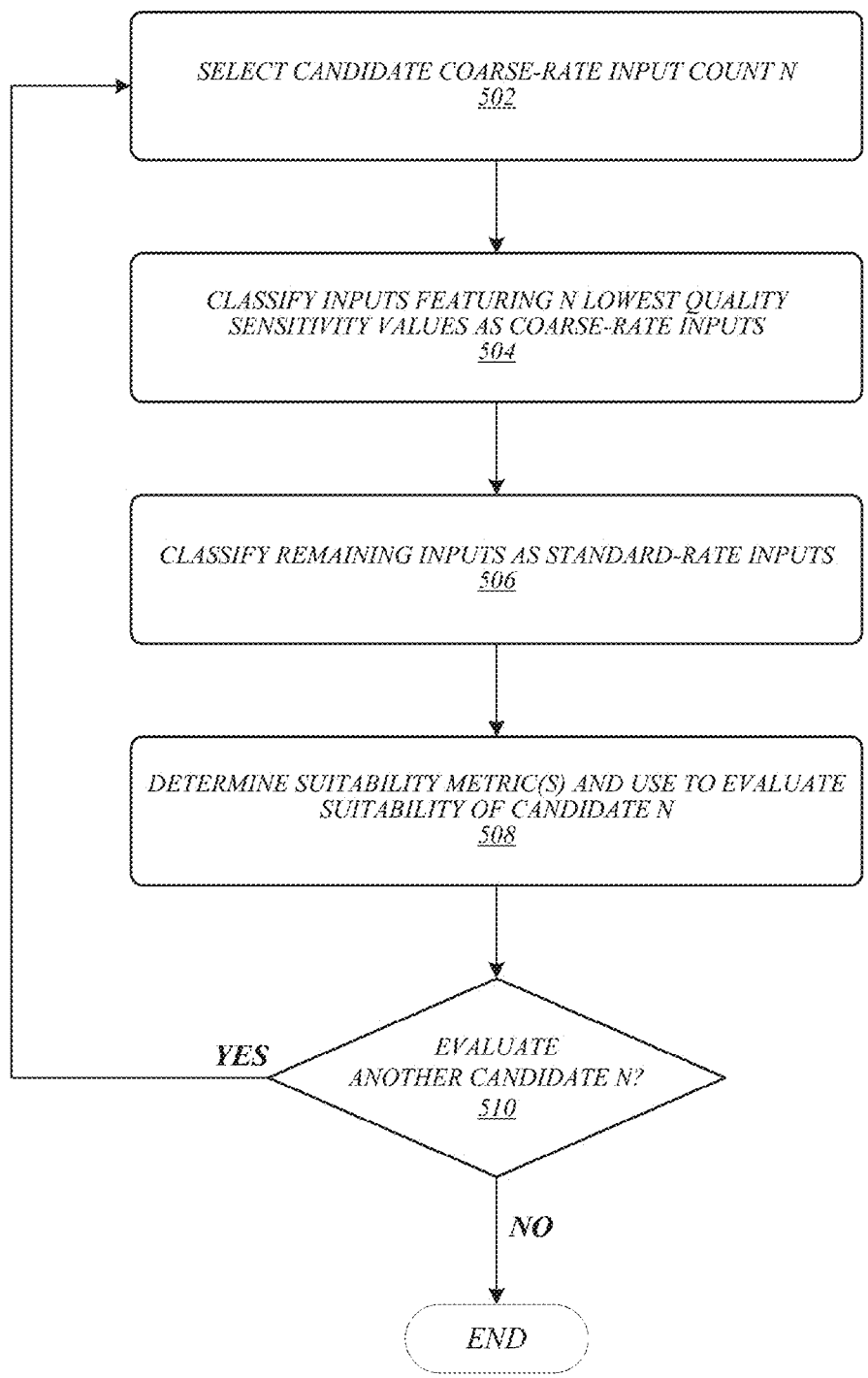
FIG. 5 illustrates an embodiment of a fourth logic flow

FIG. 5 illustrates a logic flow 500 such as may be representative of the operations at blocks 302 to 310 in logic flow 300 of FIG. 3 in various embodiments in which the classification parameter for which one or more candidate values are evaluated comprises an input count such as an input count 134 of FIG. 1. More particularly, logic flow 500 may be representative of such operations in some embodiments in which the classification parameter comprises a coarse-rate input count. As shown in logic flow 500, a candidate coarse-rate input count N may be selected at 502. For example, graphics management module 106 of FIG. 1 may be operative to select a candidate partitioning policy 128 that specifies a particular value for an input count 134 for coarse-rate inputs 114-1. At 504, the pixel shader inputs featuring the N lowest corresponding quality sensitivity values may be classified as coarse-rate inputs. For example, with respect to a set of pixel shader inputs 124 for an original pixel shader 122, graphics management module 106 of FIG. 1 may be operative to classify the pixel shader inputs 124 that feature the N lowest quality sensitivity values 126 as course-rate inputs 114-1.

At 506, each remaining pixel shader input may be classified as a standard-rate input. For example, following its aforementioned determination of course-rate inputs 114-1 at 504, graphics management module 106 of FIG. 1 may be operative to classify the remaining pixel shader inputs 124 among the set as standard-rate inputs 116-1. At 508, one or more suitability metrics may be determined for the candidate N and may be used to evaluate the suitability of the candidate N. For example, graphics management module 106 of FIG. 1 may be operative to determine one or more suitability metrics 136 for a multi-phase pixel shading procedure that comprises coarse pixel shading of the coarse-rate inputs 114-1 and standard pixel shading of the standard-rate inputs 116-1, and may be operative to evaluate the suitability of the candidate partitioning policy 128 that specifies the particular value for the input count 134 for course-rate inputs 114-1 based on the one or more suitability metrics 136. At 510, it may be determined whether another candidate N is to be evaluated. For example, graphics management module 106 of FIG. 1 may be operative to determine whether to evaluate another candidate partitioning policy 128 that specifies a different respective value for the input count 134 for course-rate inputs 114-1. If it is determined at 510 that another candidate N is to be evaluated, flow may return to 502, where another candidate N may be selected for evaluation. If it is determined at 510 that no other candidate N is to be evaluated, the logic flow may end. The embodiments are not limited in this context.

Figure 6:
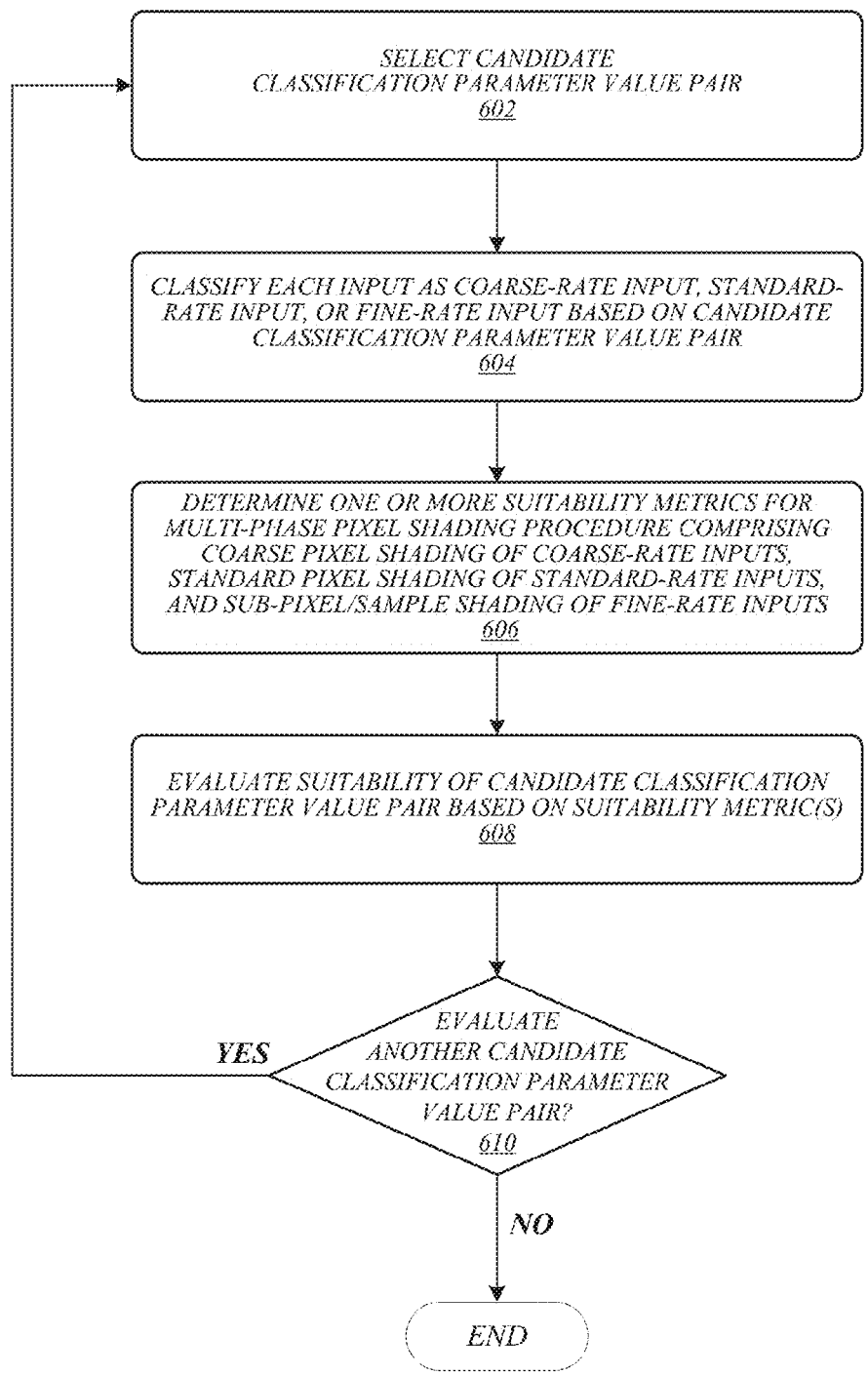
FIG. 6 illustrates an embodiment of a fifth logic flow

FIG. 6 illustrates a logic flow 600 such as may be representative of the operations at blocks 204 to 212 in logic flow 200 of FIG. 2 in various embodiments. More particularly, logic flow 600 may be representative of such operations in some embodiments in which each candidate partitioning policy comprises a respective set of candidate values for a set of classification parameters according to which a set of pixel shader inputs may be partitioned into course-rate inputs, standard-rate inputs, and fine-rate inputs. For example, logic flow 600 may be representative of operations that graphics management module 106 of FIG. 1 may perform in various embodiments to evaluate sets of candidate values for sets of classification parameters 130 for prospective use to partition a set of pixel shader inputs 124 into coarse-rate inputs 114-2, standard-rate inputs 116-2, and fine-rate inputs 118-2. As shown in logic flow 600, a candidate classification parameter value pair may be selected at 602. For example, graphics management module 106 of FIG. 1 may be operative to select a candidate partitioning policy 128 that specifies particular respective values for a pair of classification parameters 130. It is worthy of note that although logic flow 600 depicts an example scenario in which a pair of classification parameters is used to partition a set of pixel shader inputs into three classes, the embodiments are not limited to this example. Embodiments are both possible and contemplated in which greater numbers of classification parameters are used and/or in which such classification parameters are used to partition sets of pixel shader inputs into more than three classes. The embodiments are not limited in this context.

At 604, each of a set of pixel shader inputs may be classified as either a coarse-rate input, a standard-rate input, or a fine-rate input based on the candidate classification parameter value pair. For example, graphics management module 106 of FIG. 1 may be operative to classify each of a set of pixel shader inputs 124 as either a coarse-rate input 114-2, a standard-rate input 116-2, or a fine-rate input 118-2 based on the respective values specified for the pair of classification parameters 130 by the selected candidate partitioning policy 128. At 606, one or more suitability metrics may be determined for a multi-phase pixel shading procedure that comprises coarse pixel shading of the coarse-rate inputs, standard pixel shading of the standard-rate inputs, and sub-pixel/sample shading of the fine-rate inputs according to the classifications performed at 604. For example, graphics management module 106 of FIG. 1 may be operative to determine one or more suitability metrics 136 for a multi-phase pixel shading procedure that comprises coarse pixel shading of coarse-rate inputs 114-2, standard pixel shading of standard-rate inputs 116-2, and sub-pixel/sample shading of fine-rate inputs 118-2.

At 608, the suitability of the candidate classification parameter value pair may be evaluated based on the one or more suitability metrics. For example, graphics management module 106 of FIG. 1 may be operative to evaluate the suitability of the candidate partitioning policy 128 that specifies the particular respective values for the pair of classification parameters 130, based on one or more suitability metrics 136 determined at 606. At 610, it may be determined whether another candidate classification parameter value pair is to be evaluated. For example, graphics management module 106 of FIG. 1 may be operative to determine whether to evaluate another candidate partitioning policy 128 that specifies a different respective value for one or both of the pair of classification parameters 130. If it is determined at 610 that another candidate classification parameter value pair is to be evaluated, flow may return to 602, where another candidate classification parameter value pair may be selected for evaluation. If it is determined at 610 that no other candidate classification parameter value pair is to be evaluated, the logic flow may end. The embodiments are not limited in this context.

Figure 7:
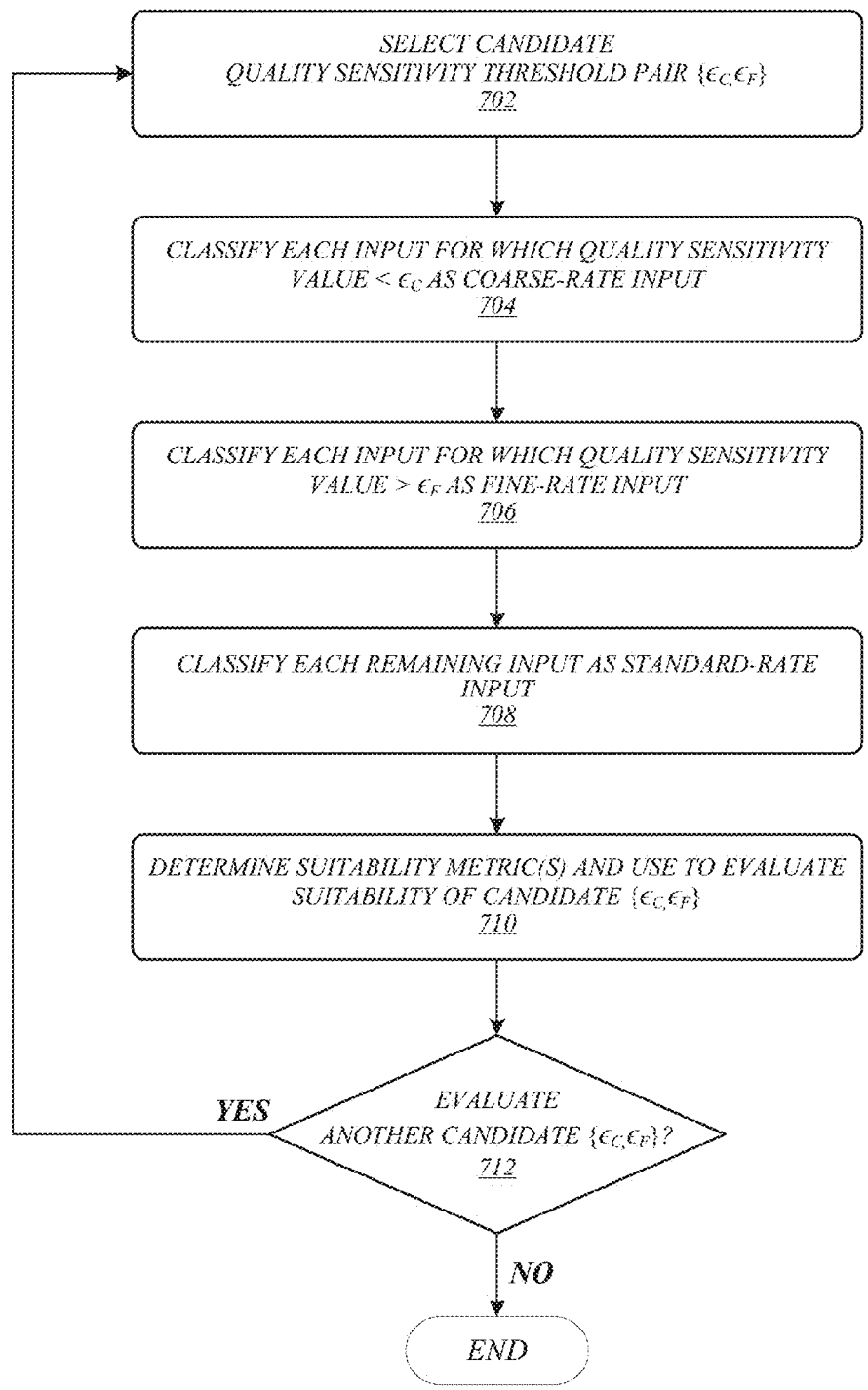
FIG. 7 illustrates an embodiment of a sixth logic flow

FIG. 7 illustrates a logic flow 700 such as may be representative of the operations at blocks 602 to 610 in logic flow 600 of FIG. 6 in some embodiments in which the pair of classification parameters for which one or more candidate value pairs are evaluated comprises a pair of quality sensitivity thresholds such as quality sensitivity thresholds 132 of FIG. 1. More particularly, logic flow 700 may be representative of such operations in various embodiments in which the pair of classification parameters comprises a coarse-rate quality sensitivity threshold and a fine-rate quality sensitivity threshold. It is worthy of note that although logic flow 700 depicts an example scenario in which a pair of quality sensitivity thresholds is used to partition a set of pixel shader inputs into three classes, the embodiments are not limited to this example. Embodiments are both possible and contemplated in which greater numbers of quality sensitivity thresholds are used and/or in which such quality sensitivity thresholds are used to partition sets of pixel shader inputs into more than three classes. The embodiments are not limited in this context.

As shown in logic flow 700, a candidate quality sensitivity threshold pair $\{\epsilon_C, \epsilon_F\}$ may be selected at 702, where $\epsilon_C$ represents a coarse-rate quality sensitivity threshold and $\epsilon_F$ represents a fine-rate quality sensitivity threshold. For example, graphics management module 106 of FIG. 1 may be operative to select a candidate partitioning policy 128 that specifies particular respective values for a quality sensitivity threshold 132 for coarse-rate inputs 114-2 and a quality sensitivity threshold 132 for fine-rate inputs 118-2. At 704, each pixel shader input for which the corresponding quality sensitivity value is less than the candidate $\epsilon_C$ may be classified as a coarse-rate input. For example, with respect to a set of pixel shader inputs 124 for an original pixel shader 122, graphics management module 106 of FIG. 1 may be operative to classify each pixel shader input 124 for which the corresponding quality sensitivity value 126 is less than the candidate $\epsilon_C$ as a course-rate input 114-2. At 706, each pixel shader input for which the corresponding quality sensitivity value is greater than the candidate $\epsilon_F$ may be classified as a fine-rate input. For example, with respect to the aforementioned set of pixel shader inputs 124, graphics management module 106 of FIG. 1 may be operative to classify each pixel shader input 124 for which the corresponding quality sensitivity value 126 is greater than the candidate $\epsilon_F$ as a fine-rate input 118-2.

At 708, each remaining pixel shader input may be classified as a standard-rate input. For example, following its aforementioned determinations of course-rate inputs 114-2 at 704 and fine-rate inputs 118-2 at 706, graphics management module 106 of FIG. 1 may be operative to classify the remaining pixel shader inputs 124 among the set as standard-rate inputs 116-2. At 710, one or more suitability metrics may be determined for the candidate pair $\{\epsilon_C, \epsilon_F\}$ and may be used to evaluate the suitability of the candidate pair $\{\epsilon_C, \epsilon_F\}$. For example, graphics management module 106 of FIG. 1 may be operative to determine one or more suitability metrics 136 for a multi-phase pixel shading procedure that comprises coarse pixel shading of the coarse-rate inputs 114-2, standard pixel shading of the standard-rate inputs 116-2, and sub-pixel/sample shading of the fine-rate inputs 118-2, and may be operative to evaluate the suitability of the candidate partitioning policy 128 that specifies the particular pair of quality sensitivity threshold 132 values based on the one or more suitability metrics 136. At 712, it may be determined whether another candidate pair $\{\epsilon_C, \epsilon_F\}$ is to be evaluated. For example, graphics management module 106 of FIG. 1 may be operative to determine whether to evaluate another candidate partitioning policy 128 that specifies a different respective value for one or both of the quality sensitivity threshold 132 for coarse-rate inputs 114-2 and the quality sensitivity threshold 132 for fine-rate inputs 118-2. If it is determined at 712 that another candidate pair $\{\epsilon_C, \epsilon_F\}$ is to be evaluated, flow may return to 702, where another candidate pair $\{\epsilon_C, \epsilon_F\}$ may be selected for evaluation. If it is determined at 712 that no other candidate pair $\{\epsilon_C, \epsilon_F\}$ is to be evaluated, the logic flow may end. The embodiments are not limited in this context.

Figure 8:
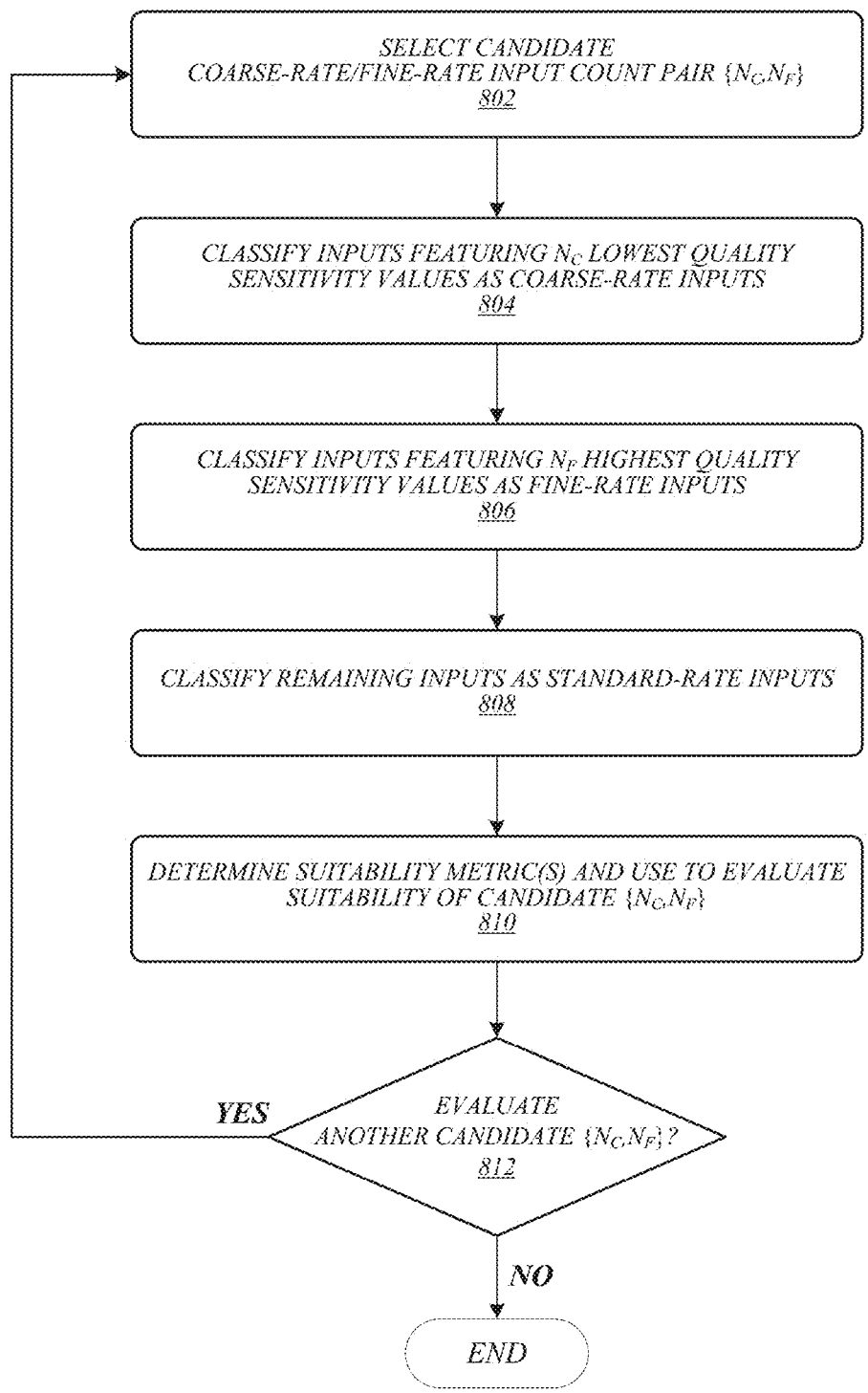
FIG. 8 illustrates an embodiment of a seventh logic flow

FIG. 8 illustrates a logic flow 800 such as may be representative of the operations at blocks 602 to 610 in logic flow 600 of FIG. 6 in some embodiments in which the pair of classification parameters for which one or more candidate value pairs are evaluated comprises a pair of input counts such as input counts 134 of FIG. 1. More particularly, logic flow 800 may be representative of such operations in various embodiments in which the pair of classification parameters comprises a coarse-rate input count and a fine-rate input count. It is worthy of note that although logic flow 800 depicts an example scenario in which a pair of input counts is used to partition a set of pixel shader inputs into three classes, the embodiments are not limited to this example. Embodiments are both possible and contemplated in which greater numbers of input counts are used and/or in which such input counts are used to partition sets of pixel shader inputs into more than three classes. The embodiments are not limited in this context.

As shown in logic flow 800, a candidate quality sensitivity threshold pair $\{N_C, N_F\}$ may be selected at 802, where $N_C$ represents a coarse-rate input count and $N_F$ represents a fine-rate input count. For example, graphics management module 106 of FIG. 1 may be operative to select a candidate partitioning policy 128 that specifies particular respective values for an input count 134 for coarse-rate inputs 114-2 and an input count 134 for fine-rate inputs 118-2. At 804, the pixel shader inputs featuring the $N_C$ lowest corresponding quality sensitivity values may be classified as coarse-rate inputs. For example, with respect to a set of pixel shader inputs 124 for an original pixel shader 122, graphics management module 106 of FIG. 1 may be operative to classify the pixel shader inputs 124 that feature the $N_C$ lowest quality sensitivity values 126 as course-rate inputs 114-2. At 806, the pixel shader inputs featuring the $N_F$ highest corresponding quality sensitivity values may be classified as fine-rate inputs. For example, with respect to the aforementioned set of pixel shader inputs 124, graphics management module 106 of FIG. 1 may be operative to classify the pixel shader inputs 124 that feature the $N_F$ highest quality sensitivity values 126 as fine-rate inputs 118-2.

At 808, each remaining pixel shader input may be classified as a standard-rate input. For example, following its aforementioned determinations of course-rate inputs 114-2 at 804 and fine-rate inputs 118-2 at 806, graphics management module 106 of FIG. 1 may be operative to classify the remaining pixel shader inputs 124 among the set as standard-rate inputs 116-2. At 810, one or more suitability metrics may be determined for the candidate pair $\{N_C, N_F\}$ and may be used to evaluate the suitability of the candidate pair $\{N_C, N_F\}$. For example, graphics management module 106 of FIG. 1 may be operative to determine one or more suitability metrics 136 for a multi-phase pixel shading procedure that comprises coarse pixel shading of the coarse-rate inputs 114-2, standard pixel shading of the standard-rate inputs 116-2, and sub-pixel/sample shading of the fine-rate inputs 118-2, and may be operative to evaluate the suitability of the candidate partitioning policy 128 that specifies the particular pair of input count 134 values based on the one or more suitability metrics 136. At 812, it may be determined whether another candidate pair $\{N_C, N_F\}$ is to be evaluated. For example, graphics management module 106 of FIG. 1 may be operative to determine whether to evaluate another candidate partitioning policy 128 that specifies a different respective value for one or both of the input count 134 for coarse-rate inputs 114-2 and the input count 134 for fine-rate inputs 118-2. If it is determined at 812 that another candidate pair $\{N_C, N_F\}$ is to be evaluated, flow may return to 802, where another candidate pair $\{N_C, N_F\}$ may be selected for evaluation. If it is determined at 812 that no other candidate pair $\{N_C, N_F\}$ is to be evaluated, the logic flow may end. The embodiments are not limited in this context.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or more of logic flow 200 of FIG. 2, logic flow 300 of FIG. 3, logic flow 400 of FIG. 4, logic flow 500 of FIG. 5, logic flow 600 of FIG. 6, logic flow 700 of FIG. 7, and logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
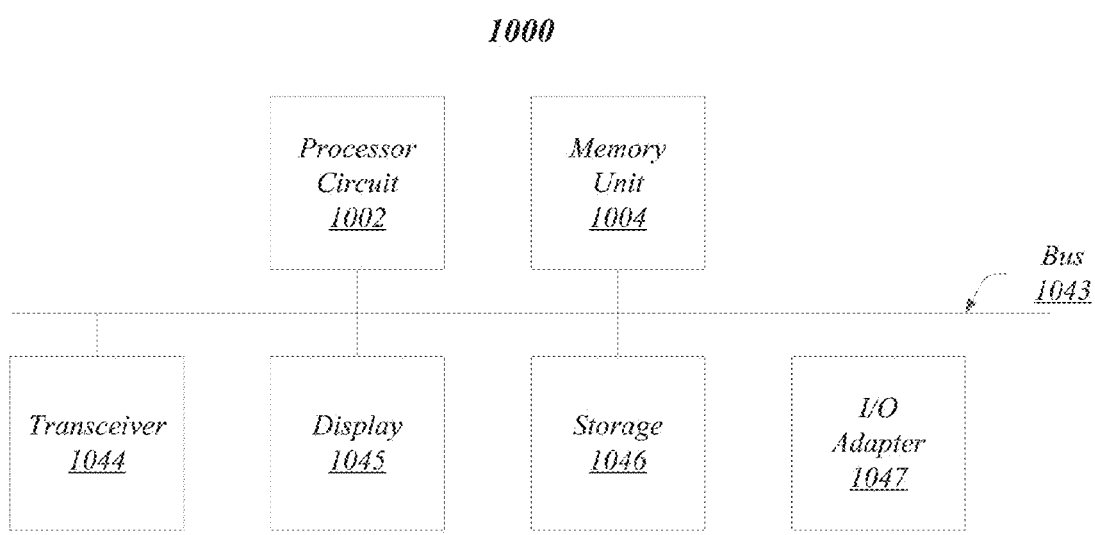
FIG. 10 illustrates an embodiment of a second system.

FIG. 10 illustrates one embodiment of a system 1000. In various embodiments, system 1000 may be representative of a system or architecture suitable for use with one or more embodiments described herein, such as one or more of logic flow 200 of FIG. 2, logic flow 300 of FIG. 3, logic flow 400 of FIG. 4, logic flow 500 of FIG. 5, logic flow 600 of FIG. 6, logic flow 700 of FIG. 7, logic flow 800 of FIG. 8, and storage medium 900 of FIG. 9. The embodiments are not limited in this respect.

As shown in FIG. 10, system 1000 may include multiple elements. One or more elements may be implemented using one or more circuits, components, registers, processors, software subroutines, modules, or any combination thereof, as desired for a given set of design or performance constraints. Although FIG. 10 shows a limited number of elements in a certain topology by way of example, it can be appreciated that more or less elements in any suitable topology may be used in system 1000 as desired for a given implementation. The embodiments are not limited in this context.

In various embodiments, system 1000 may include a processor circuit 1002. Processor circuit 1002 may be implemented using any processor or logic device, and may be the same as or similar to processor circuit 102 of FIG. 1.

In one embodiment, system 1000 may include a memory unit 1004 to couple to processor circuit 1002. Memory unit 1004 may be coupled to processor circuit 1002 via communications bus 1043, or by a dedicated communications bus between processor circuit 1002 and memory unit 1004, as desired for a given implementation. Memory unit 1004 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 1000 may include an RF transceiver 1044. RF transceiver 1044 may include one or more radios capable of transmitting and receiving signals using various suitable wireless communications techniques, and may be the same as or similar to RF transceiver 144 of FIG. 1.

In various embodiments, system 1000 may include a display 1045. Display 1045 may comprise any display device capable of displaying information received from processor circuit 1002, and may be the same as or similar to display 145 of FIG. 1. The embodiments are not limited in this context.

In various embodiments, system 1000 may include storage 1046. Storage 1046 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1046 may include technology to increase the storage performance enhanced protection for valuable digital media when multiple hard drives are included, for example. Further examples of storage 1046 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 1000 may include one or more I/O adapters 1047. Examples of I/O adapters 1047 may include Universal Serial Bus (USB) ports/adapters, IEEE 1394 Firewire ports/adapters, and so forth. The embodiments are not limited in this context.

Figure 11:
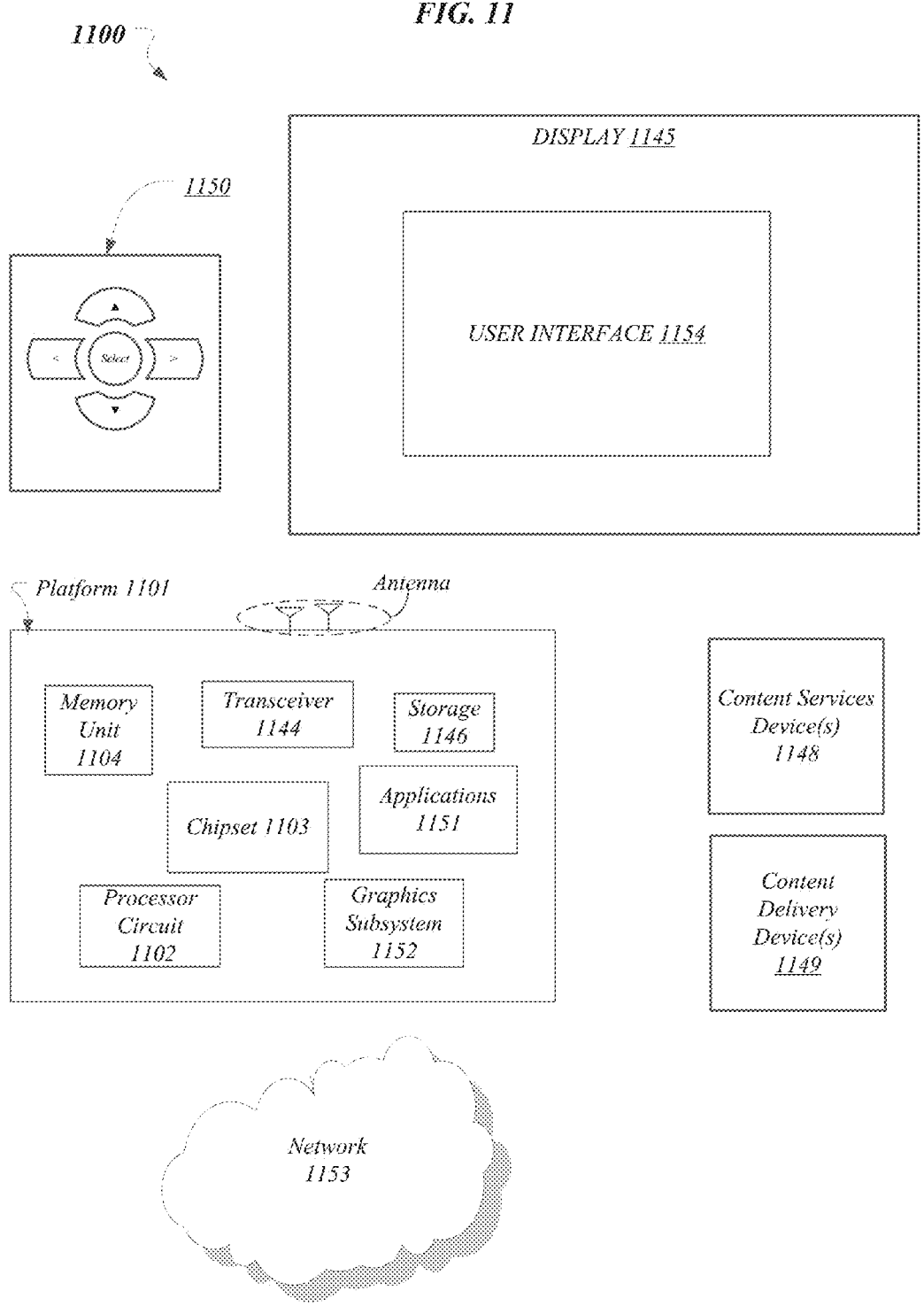
FIG. 11 illustrates an embodiment of a third system.

FIG. 11 illustrates an embodiment of a system 1100. In various embodiments, system 1100 may be representative of a system or architecture suitable for use with one or more embodiments described herein, such as one or more of logic flow 200 of FIG. 2, logic flow 300 of FIG. 3, logic flow 400 of FIG. 4, logic flow 500 of FIG. 5, logic flow 600 of FIG. 6, logic flow 700 of FIG. 7, logic flow 800 of FIG. 8, storage medium 900 of FIG. 9, and system 1000 of FIG. 10. The embodiments are not limited in this respect.

As shown in FIG. 11, system 1100 may include multiple elements. One or more elements may be implemented using one or more circuits, components, registers, processors, software subroutines, modules, or any combination thereof, as desired for a given set of design or performance constraints. Although FIG. 11 shows a limited number of elements in a certain topology by way of example, it can be appreciated that more or less elements in any suitable topology may be used in system 1100 as desired for a given implementation. The embodiments are not limited in this context.

In embodiments, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1100 includes a platform 1101 coupled to a display 1145. Platform 1101 may receive content from a content device such as content services device(s) 1148 or content delivery device(s) 1149 or other similar content sources. A navigation controller 1150 including one or more navigation features may be used to interact with, for example, platform 1101 and/or display 1145. Each of these components is described in more detail below.

In embodiments, platform 1101 may include any combination of a processor circuit 1102, chipset 1103, memory unit 1104, transceiver 1144, storage 1146, applications 1151, and/or graphics subsystem 1152. Chipset 1103 may provide intercommunication among processor circuit 1102, memory unit 1104, transceiver 1144, storage 1146, applications 1151, and/or graphics subsystem 1152. For example, chip set 1103 may include a storage adapter (not depicted) capable of providing intercommunication with storage 1146.

Processor circuit 1102 may be implemented using any processor or logic device, and may be the same as or similar to processor circuit 1002 in FIG. 10.

Memory unit 1104 may be implemented using any machine-readable or computer-readable media capable of storing data, and may be the same as or similar to memory unit 1004 in FIG. 10.

Transceiver 1144 may include one or more radios capable of transmitting and receiving signals using various suitable wireless communications techniques, and may be the same as or similar to transceiver 1044 in FIG. 10.

Display 1145 may include any television type monitor or display, and may be the same as or similar to display 1045 in FIG. 10.

Storage 1146 may be implemented as a non-volatile storage device, and may be the same as or similar to storage 1046 in FIG. 10.

Graphics subsystem 1152 may perform processing of images such as still or video for display. Graphics subsystem 1152 may be a graphics processing unit (GPU) or a visual processing unit (VPU), for example. An analog or digital interface may be used to communicatively couple graphics subsystem 1152 and display 1145. For example, the interface may be any of a High-Definition Multimedia Interface, DisplayPort, wireless HDMI, and/or wireless HD compliant techniques. Graphics subsystem 1152 could be integrated into processor circuit 1102 or chipset 1103. Graphics subsystem 1152 could be a stand-alone card communicatively coupled to chipset 1103.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1148 may be hosted by any national, international and/or independent service and thus accessible to platform 1101 via the Internet, for example. Content services device(s) 1148 may be coupled to platform 1101 and/or to display 1145. Platform 1101 and/or content services device(s) 1148 may be coupled to a network 1153 to communicate (e.g., send and/or receive) media information to and from network 1153. Content delivery device(s) 1149 also may be coupled to platform 1101 and/or to display 1145.

In embodiments, content services device(s) 1148 may include a cable television box, personal computer, network, telephone, Internet enabled devices or appliance capable of delivering digital information and/or content, and any other similar device capable of unidirectionally or bidirectionally communicating content between content providers and platform 1101 and/display 1145, via network 1153 or directly. It will be appreciated that the content may be communicated unidirectionally and/or bidirectionally to and from any one of the components in system 1100 and a content provider via network 1153. Examples of content may include any media information including, for example, video, music, medical and gaming information, and so forth.

Content services device(s) 1148 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 1101 may receive control signals from navigation controller 1150 having one or more navigation features. The navigation features of navigation controller 1150 may be used to interact with a user interface 1154, for example. In embodiments, navigation controller 1150 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be echoed on a display (e.g., display 1145) by movements of a pointer, cursor, focus ring, or other visual indicators displayed on the display. For example, under the control of software applications 1151, the navigation features located on navigation controller 1150 may be mapped to virtual navigation features displayed on user interface 1154. In embodiments, navigation controller 1150 may not be a separate component but integrated into platform 1101 and/or display 1145. Embodiments, however, are not limited to the elements or in the context shown or described herein.

In embodiments, drivers (not shown) may include technology to enable users to instantly turn on and off platform 1101 like a television with the touch of a button after initial boot-up, when enabled, for example. Program logic may allow platform 1101 to stream content to media adaptors or other content services device(s) 1148 or content delivery device(s) 1149 when the platform is turned "off." In addition, chip set 1103 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1100 may be integrated. For example, platform 1101 and content services device(s) 1148 may be integrated, or platform 1101 and content delivery device(s) 1149 may be integrated, or platform 1101, content services device(s) 1148, and content delivery device(s) 1149 may be integrated, for example. In various embodiments, platform 1101 and display 1145 may be an integrated unit. Display 1145 and content service device(s) 1148 may be integrated, or display 1145 and content delivery device(s) 1149 may be integrated, for example. These examples are not meant to limit the disclosed subject matter.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1101 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
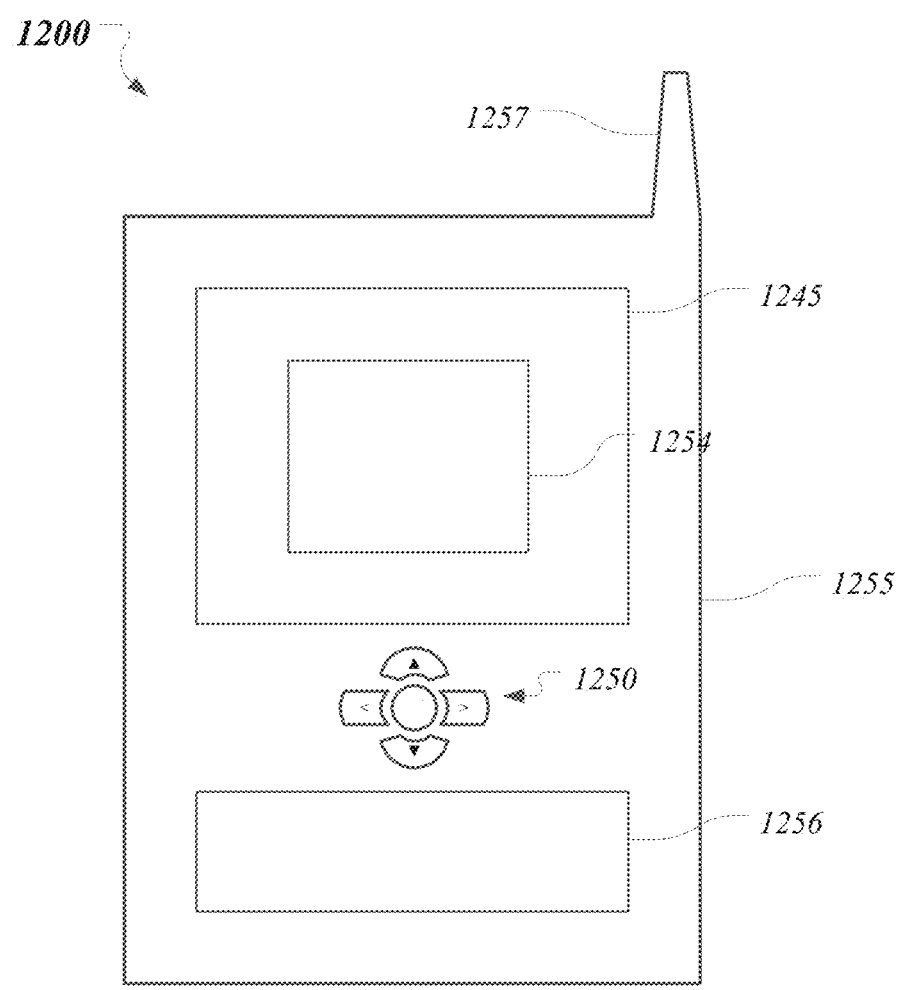
FIG. 12 illustrates an embodiment of a device.

As described above, system 1100 may be embodied in varying physical styles or form factors. FIG. 12 illustrates embodiments of a small form factor device 1200 in which system 1100 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a display 1245, a navigation controller 1250, a user interface 1254, a housing 1255, an I/O device 1256, and an antenna 1257. Display 1245 may include any suitable display unit for displaying information appropriate for a mobile computing device, and may be the same as or similar to display 1145 in FIG. 11. Navigation controller 1250 may include one or more navigation features which may be used to interact with user interface 1254, and may be the same as or similar to navigation controller 1150 in FIG. 11. I/O device 1256 may include any suitable I/O device for entering information into a mobile computing device. Examples for I/O device 1256 may include an alphanumeric keyboard, a numeric keypad, a touch pad, input keys, buttons, switches, rocker switches, microphones, speakers, voice recognition device and software, and so forth. Information also may be entered into device 1200 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a graphics processing apparatus, comprising logic, at least a portion of which is in hardware, the logic to determine one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs, select a partitioning policy for the set of pixel shader inputs from among the one or more candidate partitioning policies based on the determined suitability metrics, and construct a multi-phase pixel shader for the graphics frame by partitioning the set of pixel shader inputs into multiple classes according to the selected partitioning policy.

In Example 2, the logic of Example 1 may optionally determine a respective quality sensitivity value for each of the set of pixel shader inputs based on an input gradient of that pixel shader input.

In Example 3, the one or more respective suitability metrics for each candidate partitioning policy of any of Examples 1 to 2 may optionally include a comparative image quality metric that describes a change in image quality associated with that candidate partitioning policy.

In Example 4, the comparative image quality metric of Example 3 may optionally comprise a structural similarity metric (SSIM).

In Example 5, the comparative image quality metric of Example 3 may optionally comprise one of a structural dissimilarity metric (DSSIM), a peak signal-to-noise ratio (PSNR), a mean squared error (MSE), a universal quality index (UQI), and a video quality metric (VQM).

In Example 6, the one or more respective suitability metrics for each candidate partitioning policy of any of Examples 1 to 5 may optionally include a comparative performance metric that describes a change in performance associated with that candidate partitioning policy.

In Example 7, the comparative performance metric of Example 6 may optionally indicate a change in one or more of power consumption, graphics memory bandwidth consumption, and frame rate.

In Example 8, each of the multiple classes of any of Examples 1 to 7 may optionally correspond to a respective phase of the multi-phase pixel shader.

In Example 9, the multiple classes of any of Examples 1 to 8 may optionally comprise a coarse-rate class and a standard-rate class.

In Example 10, the logic of Example 9 may optionally partition the set of pixel shader inputs into the coarse-rate class and the standard-rate class based on a classification parameter defined by the selected partitioning policy.

In Example 11, the classification parameter of Example 10 may optionally comprise a coarse-rate quality sensitivity threshold.

In Example 12, the classification parameter of Example 10 may optionally comprise a coarse-rate input count.

In Example 13, the multiple classes of Example 9 may optionally comprise the coarse-rate class, the standard-rate class, and a fine-rate class.

In Example 14, the logic of Example 13 may optionally partition the set of pixel shader inputs into the coarse-rate class, the standard-rate class, and the fine-rate class based on a set of classification parameters defined by the selected partitioning policy.

In Example 15, the set of classification parameters of Example 14 may optionally comprise a coarse-rate quality sensitivity threshold and a fine-rate quality sensitivity threshold.

In Example 16, the set of classification parameters of Example 14 may optionally comprise a coarse-rate input count and a fine-rate input count.

In Example 17, each candidate partitioning policy of any of Examples 1 to 9 may optionally define a respective candidate quality sensitivity threshold for identifying a class of pixel shader inputs.

In Example 18, each candidate partitioning policy of any of Examples 1 to 9 may optionally define a respective set of candidate quality sensitivity thresholds for identifying two or more classes of pixel shader inputs.

In Example 19, each candidate partitioning policy of any of Examples 1 to 9 may optionally define a respective candidate input count that specifies a number of pixel shader inputs to be comprised in a class of pixel shader inputs.

In Example 20, each candidate partitioning policy of any of Examples 1 to 9 may optionally define a respective set of candidate input counts that specify numbers of pixel shader inputs to be comprised in two or more classes of pixel shader inputs.

In Example 21, the logic of any of Examples 1 to 20 may optionally select the partitioning policy from among the one or more candidate partitioning policies in response to a determination to partition the set of pixel shading inputs for multi-phase pixel shading.

In Example 22, the logic of Example 21 may optionally base the determination to partition the set of pixel shader inputs on one or more of the determined suitability metrics.

In Example 23, the logic of any of Examples 1 to 22 may optionally determine not to partition a second set of pixel shader inputs based on determined suitability metrics for one or more candidate partitioning policies for the second set of pixel shader inputs.

In Example 24, the set of pixel shader inputs of any of Examples 1 to 23 may optionally comprise a set of pixel shader inputs for an original pixel shader of the graphics frame.

Example 25 is a system, comprising an apparatus according to any of Examples 1 to 24, and a display.

Example 26 is a system, comprising an apparatus according to any of Examples 1 to 24, a radio frequency (RF) transceiver, and one or more RF antennas.

Example 27 is at least one non-transitory computer-readable storage medium comprising a set of graphics processing instructions that, in response to being executed on a computing device, cause the computing device to determine one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs, select a partitioning policy for the set of pixel shader inputs from among the one or more candidate partitioning policies based on the determined suitability metrics, and construct a multi-phase pixel shader for the graphics frame by partitioning the set of pixel shader inputs into multiple classes according to the selected partitioning policy.

In Example 28, the at least one non-transitory computer-readable storage medium of Example 27 may optionally comprise graphics processing instructions that, in response to being executed on the computing device, cause the computing device to determine a respective quality sensitivity value for each of the set of pixel shader inputs based on an input gradient of that pixel shader input.

In Example 29, the one or more respective suitability metrics for each candidate partitioning policy of any of Examples 27 to 28 may optionally include a comparative image quality metric that describes a change in image quality associated with that candidate partitioning policy.

In Example 30, the comparative image quality metric of Example 29 may optionally comprise a structural similarity metric (SSIM).

In Example 31, the comparative image quality metric of Example 29 may optionally comprise one of a structural dissimilarity metric (DSSIM), a peak signal-to-noise ratio (PSNR), a mean squared error (MSE), a universal quality index (UQI), and a video quality metric (VQM).

In Example 32, the one or more respective suitability metrics for each candidate partitioning policy of any of Examples 27 to 31 may optionally include a comparative performance metric that describes a change in performance associated with that candidate partitioning policy.

In Example 33, the comparative performance metric of Example 32 may optionally indicate a change in one or more of power consumption, graphics memory bandwidth consumption, and frame rate.

In Example 34, each of the multiple classes of any of Examples 27 to 33 may optionally correspond to a respective phase of the multi-phase pixel shader.

In Example 35, the multiple classes of any of Examples 27 to 34 may optionally comprise a coarse-rate class and a standard-rate class.

In Example 36, the at least one non-transitory computer-readable storage medium of Example 35 may optionally comprise graphics processing instructions that, in response to being executed on the computing device, cause the computing device to partition the set of pixel shader inputs into the coarse-rate class and the standard-rate class based on a classification parameter defined by the selected partitioning policy.

In Example 37, the classification parameter of Example 36 may optionally comprise a coarse-rate quality sensitivity threshold.

In Example 38, the classification parameter of Example 36 may optionally comprise a coarse-rate input count.

In Example 39, the multiple classes of Example 35 may optionally comprise the coarse-rate class, the standard-rate class, and a fine-rate class.

In Example 40, the at least one non-transitory computer-readable storage medium of Example 39 may optionally comprise graphics processing instructions that, in response to being executed on the computing device, cause the computing device to partition the set of pixel shader inputs into the coarse-rate class, the standard-rate class, and the fine-rate class based on a set of classification parameters defined by the selected partitioning policy.

In Example 41, the set of classification parameters of Example 40 may optionally comprise a coarse-rate quality sensitivity threshold and a fine-rate quality sensitivity threshold.

In Example 42, the set of classification parameters of Example 40 may optionally comprise a coarse-rate input count and a fine-rate input count.

In Example 43, each candidate partitioning policy of any of Examples 27 to 35 may optionally define a respective candidate quality sensitivity threshold for identifying a class of pixel shader inputs.

In Example 44, each candidate partitioning policy of any of Examples 27 to 35 may optionally define a respective set of candidate quality sensitivity thresholds for identifying two or more classes of pixel shader inputs.

In Example 45, each candidate partitioning policy of any of Examples 27 to 35 may optionally define a respective candidate input count that specifies a number of pixel shader inputs to be comprised in a class of pixel shader inputs.

In Example 46, each candidate partitioning policy of any of Examples 27 to 35 may optionally define a respective set of candidate input counts that specify numbers of pixel shader inputs to be comprised in two or more classes of pixel shader inputs.

In Example 47, the at least one non-transitory computer-readable storage medium of any of Examples 27 to 46 may optionally comprise graphics processing instructions that, in response to being executed on the computing device, cause the computing device to select the partitioning policy from among the one or more candidate partitioning policies in response to a determination to partition the set of pixel shading inputs for multi-phase pixel shading.

In Example 48, the at least one non-transitory computer-readable storage medium of Example 47 may optionally comprise graphics processing instructions that, in response to being executed on the computing device, cause the computing device to base the determination to partition the set of pixel shader inputs on one or more of the determined suitability metrics.

In Example 49, the at least one non-transitory computer-readable storage medium of any of Examples 27 to 48 may optionally comprise graphics processing instructions that, in response to being executed on the computing device, cause the computing device to determine not to partition a second set of pixel shader inputs based on determined suitability metrics for one or more candidate partitioning policies for the second set of pixel shader inputs.

In Example 50, the set of pixel shader inputs of any of Examples 27 to 49 may optionally comprise a set of pixel shader inputs for an original pixel shader of the graphics frame.

Example 51 is a graphics processing method, comprising determining, by a processor circuit, one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs, selecting a partitioning policy for the set of pixel shader inputs from among the one or more candidate partitioning policies based on the determined suitability metrics, and constructing a multi-phase pixel shader for the graphics frame by partitioning the set of pixel shader inputs into multiple classes according to the selected partitioning policy.

In Example 52, the graphics processing method of Example 51 may optionally comprise determining a respective quality sensitivity value for each of the set of pixel shader inputs based on an input gradient of that pixel shader input.

In Example 53, the one or more respective suitability metrics for each candidate partitioning policy of any of Examples 51 to 52 may optionally include a comparative image quality metric that describes a change in image quality associated with that candidate partitioning policy.

In Example 54, the comparative image quality metric of Example 53 may optionally comprise a structural similarity metric (SSIM).

In Example 55, the comparative image quality metric of Example 53 may optionally comprise one of a structural dissimilarity metric (DSSIM), a peak signal-to-noise ratio (PSNR), a mean squared error (MSE), a universal quality index (UQI), and a video quality metric (VQM).

In Example 56, the one or more respective suitability metrics for each candidate partitioning policy of any of Examples 51 to 55 may optionally include a comparative performance metric that describes a change in performance associated with that candidate partitioning policy.

In Example 57, the comparative performance metric of Example 56 may optionally indicate a change in one or more of power consumption, graphics memory bandwidth consumption, and frame rate.

In Example 58, each of the multiple classes of any of Examples 51 to 57 may optionally correspond to a respective phase of the multi-phase pixel shader.

In Example 59, the multiple classes of any of Examples 51 to 58 may optionally comprise a coarse-rate class and a standard-rate class.

In Example 60, the graphics processing method of Example 59 may optionally comprise partitioning the set of pixel shader inputs into the coarse-rate class and the standard-rate class based on a classification parameter defined by the selected partitioning policy.

In Example 61, the classification parameter of Example 60 may optionally comprise a coarse-rate quality sensitivity threshold.

In Example 62, the classification parameter of Example 60 may optionally comprise a coarse-rate input count.

In Example 63, the multiple classes of Example 59 may optionally comprise the coarse-rate class, the standard-rate class, and a fine-rate class.

In Example 64, the graphics processing method of Example 63 may optionally comprise partitioning the set of pixel shader inputs into the coarse-rate class, the standard-rate class, and the fine-rate class based on a set of classification parameters defined by the selected partitioning policy.

In Example 65, the set of classification parameters of Example 64 may optionally comprise a coarse-rate quality sensitivity threshold and a fine-rate quality sensitivity threshold.

In Example 66, the set of classification parameters of Example 64 may optionally comprise a coarse-rate input count and a fine-rate input count.

In Example 67, each candidate partitioning policy of any of Examples 51 to 59 may optionally define a respective candidate quality sensitivity threshold for identifying a class of pixel shader inputs.

In Example 68, each candidate partitioning policy of any of Examples 51 to 59 may optionally define a respective set of candidate quality sensitivity thresholds for identifying two or more classes of pixel shader inputs.

In Example 69, each candidate partitioning policy of any of Examples 51 to 59 may optionally define a respective candidate input count that specifies a number of pixel shader inputs to be comprised in a class of pixel shader inputs.

In Example 70, each candidate partitioning policy of any of Examples 51 to 59 may optionally define a respective set of candidate input counts that specify numbers of pixel shader inputs to be comprised in two or more classes of pixel shader inputs.

In Example 71, the graphics processing method of any of Examples 51 to 70 may optionally comprise selecting the partitioning policy from among the one or more candidate partitioning policies in response to a determination to partition the set of pixel shading inputs for multi-phase pixel shading.

In Example 72, the graphics processing method of Example 71 may optionally comprise basing the determination to partition the set of pixel shader inputs on one or more of the determined suitability metrics.

In Example 73, the graphics processing method of any of Examples 51 to 72 may optionally comprise determining not to partition a second set of pixel shader inputs based on determined suitability metrics for one or more candidate partitioning policies for the second set of pixel shader inputs.

In Example 74, the set of pixel shader inputs of any of Examples 51 to 73 may optionally comprise a set of pixel shader inputs for an original pixel shader of the graphics frame.

Example 75 is at least one non-transitory computer-readable storage medium comprising a set of instructions that, in response to being executed on a computing device, cause the computing device to perform a graphics processing method according to any of Examples 51 to 74.

Example 76 is an apparatus, comprising means for performing a graphics processing method according to any of Examples 51 to 74.

Example 77 is a system, comprising an apparatus according to Example 76, and a display.

Example 78 is a system, comprising an apparatus according to Example 76, a radio frequency (RF) transceiver, and one or more RF antennas.

Example 79 is a graphics processing apparatus, comprising means for determining one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs, means for selecting a partitioning policy for the set of pixel shader inputs from among the one or more candidate partitioning policies based on the determined suitability metrics, and means for constructing a multi-phase pixel shader for the graphics frame by partitioning the set of pixel shader inputs into multiple classes according to the selected partitioning policy.

In Example 80, the graphics processing apparatus of Example 79 may optionally comprise means for determining a respective quality sensitivity value for each of the set of pixel shader inputs based on an input gradient of that pixel shader input.

In Example 81, the one or more respective suitability metrics for each candidate partitioning policy of any of Examples 79 to 80 may optionally include a comparative image quality metric that describes a change in image quality associated with that candidate partitioning policy.

In Example 82, the comparative image quality metric of Example 81 may optionally comprise a structural similarity metric (SSIM).

In Example 83, the comparative image quality metric of Example 81 may optionally comprise one of a structural dissimilarity metric (DSSIM), a peak signal-to-noise ratio (PSNR), a mean squared error (MSE), a universal quality index (UQI), and a video quality metric (VQM).

In Example 84, the one or more respective suitability metrics for each candidate partitioning policy of any of Examples 79 to 83 may optionally include a comparative performance metric that describes a change in performance associated with that candidate partitioning policy.

In Example 85, the comparative performance metric of Example 84 may optionally indicate a change in one or more of power consumption, graphics memory bandwidth consumption, and frame rate.

In Example 86, each of the multiple classes of any of Examples 79 to 85 may optionally correspond to a respective phase of the multi-phase pixel shader.

In Example 87, the multiple classes of any of Examples 79 to 86 may optionally comprise a coarse-rate class and a standard-rate class.

In Example 88, the graphics processing apparatus of Example 87 may optionally comprise means for partitioning the set of pixel shader inputs into the coarse-rate class and the standard-rate class based on a classification parameter defined by the selected partitioning policy.

In Example 89, the classification parameter of Example 88 may optionally comprise a coarse-rate quality sensitivity threshold.

In Example 90, the classification parameter of Example 88 may optionally comprise a coarse-rate input count.

In Example 91, the multiple classes of Example 87 may optionally comprise the coarse-rate class, the standard-rate class, and a fine-rate class.

In Example 92, the graphics processing apparatus of Example 91 may optionally comprise means for partitioning the set of pixel shader inputs into the coarse-rate class, the standard-rate class, and the fine-rate class based on a set of classification parameters defined by the selected partitioning policy.

In Example 93, the set of classification parameters of Example 92 may optionally comprise a coarse-rate quality sensitivity threshold and a fine-rate quality sensitivity threshold.

In Example 94, the set of classification parameters of Example 92 may optionally comprise a coarse-rate input count and a fine-rate input count.

In Example 95, each candidate partitioning policy of any of Examples 79 to 87 may optionally define a respective candidate quality sensitivity threshold for identifying a class of pixel shader inputs.

In Example 96, each candidate partitioning policy of any of Examples 79 to 87 may optionally define a respective set of candidate quality sensitivity thresholds for identifying two or more classes of pixel shader inputs.

In Example 97, each candidate partitioning policy of any of Examples 79 to 87 may optionally define a respective candidate input count that specifies a number of pixel shader inputs to be comprised in a class of pixel shader inputs.

In Example 98, each candidate partitioning policy of any of Examples 79 to 87 may optionally define a respective set of candidate input counts that specify numbers of pixel shader inputs to be comprised in two or more classes of pixel shader inputs.

In Example 99, the graphics processing apparatus of any of Examples 79 to 98 may optionally comprise means for selecting the partitioning policy from among the one or more candidate partitioning policies in response to a determination to partition the set of pixel shading inputs for multi-phase pixel shading.

In Example 100, the graphics processing apparatus of Example 99 may optionally comprise means for basing the determination to partition the set of pixel shader inputs on one or more of the determined suitability metrics.

In Example 101, the graphics processing apparatus of any of Examples 79 to 100 may optionally comprise means for determining not to partition a second set of pixel shader inputs based on determined suitability metrics for one or more candidate partitioning policies for the second set of pixel shader inputs.

In Example 102, the set of pixel shader inputs of any of Examples 79 to 101 may optionally comprise a set of pixel shader inputs for an original pixel shader of the graphics frame.

Example 103 is a system, comprising a graphics processing apparatus according to any of Examples 79 to 102, and a display.

Example 104 is a system, comprising a graphics processing apparatus according to any of Examples 79 to 102, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processor circuit; and
non-transitory computer-readable storage media having stored thereon instructions for execution by the processor circuit to:
determine one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs;
select a partitioning policy for the set of pixel shader inputs from among the one or more candidate partitioning policies based on the determined suitability metrics; and
construct a multi-phase pixel shader for the graphics frame by partitioning the set of pixel shader inputs into multiple classes according to the selected partitioning policy.

2. The apparatus of claim 1, the non-transitory computer-readable storage media having stored thereon instructions for execution by the processor circuit to determine a respective quality sensitivity value for each of the set of pixel shader inputs based on an input gradient of that pixel shader input.

3. The apparatus of claim 1, the one or more respective suitability metrics for each candidate partitioning policy including a comparative image quality metric that describes a change in image quality associated with that candidate partitioning policy.

4. The apparatus of claim 3, the comparative image quality metric comprising a structural similarity metric (SSIM).

5. The apparatus of claim 1, the non-transitory computer-readable storage media having stored thereon instructions for execution by the processor circuit to partition the set of pixel shader inputs into a coarse-rate class and a standard-rate class based on a coarse-rate quality sensitivity threshold defined by the selected partitioning policy.

6. The apparatus of claim 1, the non-transitory computer-readable storage media having stored thereon instructions for execution by the processor circuit to partition the set of pixel shader inputs into a coarse-rate class and a standard-rate class based on a coarse-rate input count defined by the selected partitioning policy.

7. The apparatus of claim 1, the non-transitory computer-readable storage media having stored thereon instructions for execution by the processor circuit to partition the set of pixel shader inputs into a coarse-rate class, a standard-rate class, and a fine-rate class based on a set of classification parameters defined by the selected partitioning policy.

8. The apparatus of claim 1, the set of pixel shader inputs comprising a set of pixel shader inputs for an original pixel shader of the graphics frame.

9. A system, comprising:
an apparatus according to any of claims 1 to 8; and
a display.

10. At least one non-transitory computer-readable storage medium comprising a set of instructions that, in response to being executed on a computing device, cause the computing device to:
determine one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs;
select a partitioning policy for the set of pixel shader inputs from among the one or more candidate partitioning policies based on the determined suitability metrics; and
construct a multi-phase pixel shader for the graphics frame by partitioning the set of pixel shader inputs into multiple classes according to the selected partitioning policy.

11. The at least one non-transitory computer-readable storage medium of claim 10, comprising instructions that, in response to being executed on the computing device, cause the computing device to determine a respective quality sensitivity value for each of the set of pixel shader inputs based on an input gradient of that pixel shader input.

12. The at least one non-transitory computer-readable storage medium of claim 10, the one or more respective suitability metrics for each candidate partitioning policy including a comparative image quality metric that describes a change in image quality associated with that candidate partitioning policy.

13. The at least one non-transitory computer-readable storage medium of claim 12, the comparative image quality metric comprising a structural similarity metric (SSIM).

14. The at least one non-transitory computer-readable storage medium of claim 10, comprising instructions that, in response to being executed on the computing device, cause the computing device to partition the set of pixel shader inputs into a coarse-rate class and a standard-rate class based on a coarse-rate quality sensitivity threshold defined by the selected partitioning policy.

15. The at least one non-transitory computer-readable storage medium of claim 10, comprising instructions that, in response to being executed on the computing device, cause the computing device to partition the set of pixel shader inputs into a coarse-rate class and a standard-rate class based on a coarse-rate input count defined by the selected partitioning policy.

16. The at least one non-transitory computer-readable storage medium of claim 10, comprising instructions that, in response to being executed on the computing device, cause the computing device to partition the set of pixel shader inputs into a coarse-rate class, a standard-rate class, and a fine-rate class based on set of classification parameters defined by the selected partitioning policy.

17. The at least one non-transitory computer-readable storage medium of claim 10, the set of pixel shader inputs comprising a set of pixel shader inputs for an original pixel shader of the graphics frame.

18. A method, comprising:
determining, by a processor circuit, one or more respective suitability metrics for each of one or more candidate partitioning policies for a set of pixel shader inputs for a graphics frame, each candidate partitioning policy comprising one or more rules for partitioning the set of pixel shader inputs for multi-phase pixel shading based on quality sensitivity values for the pixel shader inputs;
selecting a partitioning policy for the set of pixel shader inputs from among the one or more candidate partitioning policies based on the determined suitability metrics; and
constructing a multi-phase pixel shader for the graphics frame by partitioning the set of pixel shader inputs into multiple classes according to the selected partitioning policy.

19. The method of claim 18, comprising determining a respective quality sensitivity value for each of the set of pixel shader inputs based on an input gradient of that pixel shader input.

20. The method of claim 18, the one or more respective suitability metrics for each candidate partitioning policy including a comparative image quality metric that describes a change in image quality associated with that candidate partitioning policy.

21. The method of claim 20, the comparative image quality metric comprising a structural similarity metric (SSIM).

22. The method of claim 18, comprising partitioning the set of pixel shader inputs into a coarse-rate class and a standard-rate class based on a coarse-rate quality sensitivity threshold defined by the selected partitioning policy.

23. The method of claim 18, comprising partitioning the set of pixel shader inputs into a coarse-rate class and a standard-rate class based on a coarse-rate input count defined by the selected partitioning policy.

24. The method of claim 18, comprising partitioning the set of pixel shader inputs into a coarse-rate class, a standard-rate class, and a fine-rate class based on a set of classification parameters defined by the selected partitioning policy.

25. The method of claim 18, the set of pixel shader inputs comprising a set of pixel shader inputs for an original pixel shader of the graphics frame.

* * * * *